US012138499B2

(12) United States Patent
Silva, Jr.

(10) Patent No.: US 12,138,499 B2
(45) Date of Patent: Nov. 12, 2024

(54) FIRE PROTECTION SYSTEMS AND METHODS FOR STORAGE

(71) Applicant: Tyco Fire Products LP, Lansdale, PA (US)

(72) Inventor: Manuel R. Silva, Jr., Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 21 days.

(21) Appl. No.: 17/834,639

(22) Filed: Jun. 7, 2022

(65) Prior Publication Data

US 2022/0296944 A1 Sep. 22, 2022

Related U.S. Application Data

(63) Continuation of application No. 16/308,282, filed as application No. PCT/US2017/037035 on Jun. 12, 2017, now Pat. No. 11,547,885.

(60) Provisional application No. 62/348,767, filed on Jun. 10, 2016.

(51) Int. Cl.

| | |
|---|---|
| ***A62C 35/64*** | (2006.01) |
| ***A62C 31/02*** | (2006.01) |
| ***A62C 35/68*** | (2006.01) |
| ***A62C 37/08*** | (2006.01) |
| ***A62C 37/50*** | (2006.01) |

(52) U.S. Cl.
CPC ............ *A62C 35/645* (2013.01); *A62C 31/02* (2013.01); *A62C 35/68* (2013.01); *A62C 37/08* (2013.01); *A62C 37/50* (2013.01)

(58) Field of Classification Search
CPC ....... A62C 35/645; A62C 35/60; A62C 35/68; A62C 31/02; A62C 37/08; A62C 37/50; A62C 3/002; B05B 1/26; B05B 1/262; B05B 1/265; B05B 1/267
See application file for complete search history.

(56) References Cited

U.S. PATENT DOCUMENTS 6,976,543 B1 * 12/2005 Fischer .................. A62C 37/08 169/41
8,714,274 B2 * 5/2014 Golinveaux ........... A62C 35/60 169/17

FOREIGN PATENT DOCUMENTS

WO WO-2007/048144 4/2007
WO WO-2015100367 A1 * 7/2015 ............... A62C 3/00
WO WO-2015/191619 A1 12/2015

OTHER PUBLICATIONS

International Search Report and Written Opinion for International Application No. PCT/US2017/037035, mail date Jan. 18, 2018, 20 pages.

* cited by examiner

*Primary Examiner* — Christopher R Dandridge
(74) *Attorney, Agent, or Firm* — Foley & Lardner LLP

(57) ABSTRACT

Ceiling only dry sprinkler systems and methods for protection of a storage occupancy employing a mandatory fluid delivery delay period. The systems and methods provide for fire protection of stored commodities of forty-five feet or greater with a hydraulic design ranging from six to eighteen design sprinklers. The systems and methods employ an upright sprinkler having a nominal K-factor greater than 28.

18 Claims, 19 Drawing Sheets

FIRE PROTECTION SYSTEMS AND METHODS FOR STORAGE

PRIORITY

The present application is a continuation of U.S. patent application Ser. No. 16/308,282, filed Dec. 7, 2018, which is a national phase application of International Application No. PCT/US2017/037035, filed Jun. 12, 2017, which claims the benefit of priority to U.S. Provisional Application No. 62/348,767 filed on Jun. 10, 2016. The contents of U.S. patent application Ser. No. 16/308,282, International Application No. PCT/US2017/037035, and U.S. Provisional Application No. 62/348,767 are incorporated herein by reference in their entirety for all purposes.

INCORPORATION BY REFERENCE

PCT International Application Publication No. WO 2007/048144 (hereinafter "WO2007/048144") is incorporated by reference in its entirety.

TECHNICAL FIELD

This invention relates generally to dry sprinkler fire protection systems and the method of their design and installation. More specifically, the present invention provides a dry sprinkler system, suitable for the protection of storage occupancies. The present invention is further directed to the methods of designing and installing such systems.

BACKGROUND OF THE INVENTION

Fire protection systems for storage occupancies and storage stored on racks can be a system with fire protection sprinklers mounted on the storage racks, i.e., "in-rack sprinklers." Alternatively, the systems can be a "ceiling-only" fire protection systems, in which the fire protection sprinklers are only mounted proximate the ceiling of the occupancy thereby eliminating the use of in-rack sprinklers. WO2007/048144 shows and describes systems and methods for ceiling-only dry pipe fire protection for storage occupancies in which the firefighting fluid is delivered to actuated sprinklers with a mandatory fluid delivery delay period to address a fire with a surround and drown effect. According to WO2007/048144, employing the mandatory fluid delivery delay period can provide for lower hydraulic demands as compared dry system and/or equivalent to wet system designed under known fire protection industry installation standards, such as for example NFPA-13 Standard for the Installation of Sprinkler Systems (2016 ed.) (hereinafter "NFPA-13"), to protect similar storage heights and at similar nominal ceiling heights. WO2007/048144 describes hydraulic design criteria in terms of a number of design sprinklers for nominal ceiling heights of up to forty-five feet (45 ft.) and storage heights of up to forty feet (40 ft.). Although the number of design sprinklers disclosed in WO2007/048144 for a fire protection system with a mandatory fluid delivery delay are lower than those for known fire protection systems without a mandatory fluid delivery delay period, WO2007/048144 also teaches that the number of design sprinklers generally increases with an increase in the storage height and/or nominal ceiling height. Despite the innovative approach to fire protection disclosed by WO2007/048144, fire protection systems for storage heights hereto for uncommercialized, in order to be commercialized, the number of design sprinklers for such systems need to be commercially practical.

DISCLOSURE OF INVENTION

Preferred systems and methods of ceiling-only dry fire protection are provided for protection of stored commodities having at storage heights up to forty-five feet (45 ft.) and over, preferably up to a storage height of no more than (60 ft.) with an unexpected hydraulic demand or design area based on six to eighteen (6-18) hydraulically remote sprinklers and/or less than 2500 square feet. The preferred systems and methods provide ceiling-only dry fire protection for storage heights up to forty-five feet (45 ft.) and over with a number of design sprinklers that is equal to less than the number of design sprinklers for dry ceiling-only fire protection in the protection of storage below forty-five feet (45 ft.) in height as compared to known systems. The preferred systems employ a mandatory fluid delivery period that is preferably no more than twenty to thirty seconds (20-30 secs.). The preferred system and methods include a grid of upright sprinklers defining a sprinkler-to-sprinkler spacing ranging from eight-by-eight feet to twenty-by-twenty feet (8 ft.-20 ft.) with a preferred hydraulic design area defined by a number of hydraulically remote sprinklers ranging between six to eighteen (6-18) sprinklers. The preferred systems and methods provide for protection of stored commodities of any one of Class I, Class II, and Class III stored beneath a ceiling having a ceiling height ranging from fifty feet to sixty-five feet (50 ft.-65 ft.) with the commodity having a maximum storage height ranging from about forty-five feet to no more than sixty feet (45 ft.-60 ft.) and a configuration of high piled storage including single, double, or multiple-row rack storage or palletized, bin box, solid piled or shelf storage.

The preferred systems and methods includes a preferred upright fire protection sprinkler having a sprinkler body with an inlet and an outlet with a passageway disposed therebetween and extending along a sprinkler axis to define a nominal K-factor of greater than 28; a closure assembly; a thermally rated trigger assembly to support the closure assembly adjacent the outlet of the sprinkler body with a temperature rating ranging from 250° F.-300° F. The preferred upright sprinkler includes a deflector member that has a domed geometry with an outer surface and an inner surface including: a peripheral region, a central region and an intermediate region between the peripheral and central regions. The intermediate region includes a primary deflecting surface, a secondary deflecting surface and a transition from the primary deflecting surface to the secondary deflecting surface, the transition defines a perimeter about the secondary deflecting surface such that the secondary deflecting surface is surrounded by the primary deflecting surface.

The preferred upright sprinkler provides an innovative substantially non-circular spray pattern beneath the peripheral region of the deflector member. The non-circular spray pattern preferably defines at least four zones of fluid density concentrically formed about the sprinkler axis. The four zones includes a first zone defining the central region of the spray pattern, a third zone defining a perimeter of the spray pattern with a second zone formed between the first and third zones, and a fourth zone formed about the third zone, the fluid density in the third zone ranging from 40%-60% of the fluid density in the first zone, the first zone having a fluid density greater than the fluid density in each of the second, third and fourth zones.

BRIEF DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are not the totality of the invention but are examples of the invention as provided by the appended claims.

MODE(S) FOR CARRYING OUT THE INVENTION

Figure 1:
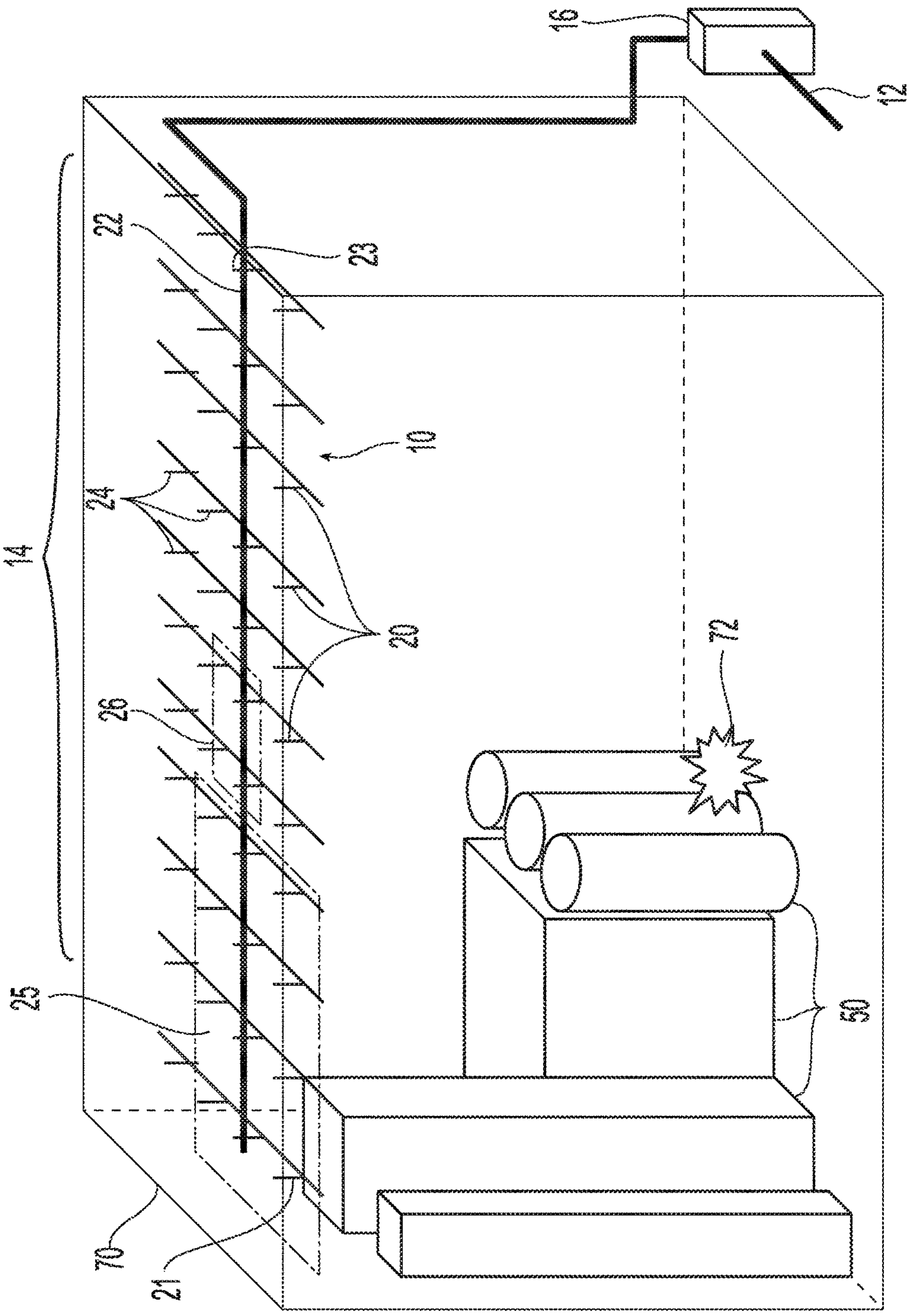
FIG. 1 is an illustrative embodiment of a preferred dry sprinkler system located in a storage area having a stored commodity.

A preferred dry sprinkler system 10, as seen in FIG. 1, is configured for protection of a stored commodity 50 in a storage area or occupancy 70. The system 10 includes a network of pipes having a wet portion 12 and a dry portion 14 preferably coupled to one another by a primary water control valve 16 which is preferably a deluge or preaction valve or alternatively, an air-to-water ratio valve. The wet portion 12 is preferably connected to a supply of firefighting liquid such as, for example, a water main. The dry portion 14 includes a network or grid of sprinklers 20 interconnected by a network of pipes filled with air or other gas in an unactuated state of the system 10. Air pressure within the dry portion alone or in combination with another control mechanism controls the open/closed state of the primary water control valve 16. With the preferred systems having a dry portion 14, the systems 10 can provide fire protection for a refrigerated, cold or freezer storage occupancy. Opening the primary water control valve 16 releases water from the wet portion 12 into the dry portion 14 of the system to be discharged through an open sprinkler 20. The wet portion 12 can further include additional devices (not shown) such as, for example, fire pumps, or backflow preventers to deliver the water to the dry portion 14 at a desired flow rate and/or pressure.

The preferred sprinkler system 10 is configured to protect the stored commodity 50 by effectively addressing a fire growth 72 in the storage area 70, and in particular a high-challenge fire as is understood in the art, with a preferred sprinkler operational area 26, as seen in FIG. 1. A sprinkler operational area 26 is preferably defined by a minimum number of activated sprinklers thermally triggered by a fire growth 72 which address the fire event or growth 72. More specifically, the preferred sprinkler operational area 26 is formed by a minimum number of activated and appropriately spaced sprinklers configured to deliver a volume of water or other firefighting fluid having adequate flow characteristics, i.e. flow rate and/or pressure, to address the fire from above. The number of thermally activated sprinklers 20 defining the operational area 26 is preferably substantially smaller than the total number of available sprinklers 20 in the dry portion 14 of the system 10. The number of activated sprinklers forming the sprinkler operational area 26 is minimized both to effectively address a fire and further minimize the extent to which water is discharge from the system 10. “Activated” or “actuated” as used herein means that the sprinkler is in an open state for the delivery of water.

Upon activation of the sprinkler 20, the compressed air or other preferably pressurized gas in the network of pipes escapes to reduce the pressure therein, and alone or in combination with a smoke or fire indicator, which trips open the primary water control valve 16. The open primary water control valve 16 permits water or other firefighting fluid to fill the network of pipes and travel to the activated sprinklers 20. As the water travels through the piping of the system 10, the absence of water, and more specifically the absence of water at designed operating discharge pressure, in the storage area 70 permits the fire to grow releasing additional heat into the storage area 70. Water eventually reaches the group of activated sprinklers 20 and begins to discharge over the fire from the preferred operational area 26 building-up to operating pressure yet permitting a continued increase in the heat release rate. The added heat continues the thermal trigger of additional sprinklers proximate the initially triggered sprinkler to preferably define the desired sprinkler operational area 26 and configuration. The water discharge reaches full operating pressure out of the operational area 26 to effectively address the fire and more preferably surround and drown so as to overwhelm and subdue the fire. As described in WO2007/048144, “surround and drown” means to substantially surround a burning area with a discharge of water to rapidly reduce the heat release rate. Moreover, the system is preferably configured such that all the activated sprinklers forming the operating area 26 are preferably activated within a predetermined time period. More specifically, the last activated sprinkler occurs within ten minutes following the first thermal sprinkler activation in the system 10. More preferably, the last sprinkler is activated within eight minutes and more preferably, the last sprinkler is activated within five minutes or less of the first sprinkler activation in the system 10.

The preferred system 10 incorporates a mandatory water or fluid delivery delay period of an adequate length to effectively form a sprinkler operational area 26 sufficient to address a fire, for example, by a surround and drown effect. To ensure that a sufficient number of sprinklers 20 are thermally activated to form a sprinkler operational area 26 anywhere in the system 10 sufficient to address the fire growth 72, one or more sprinkler in the system 10 have a properly configured mandatory fluid delivery delay period. The mandatory fluid delivery delay period is preferably measured from the moment following thermal activation of at least one initial sprinkler 20 to the moment of fluid discharge from the one or more sprinklers forming the desired sprinkler operational area 26 at system operating pressure to effectively address, more preferably, surround and drown, to overwhelm and subdue the fire. The size of an operational area 26 is preferably directly related to the length of the mandatory fluid delivery delay period. The longer the mandatory fluid delivery delay period, the larger the fire growth resulting in more sprinkler activations to form a larger resultant sprinkler operational area 26. Conversely, the smaller the fluid delivery delay period, the smaller the resulting operational area 26.

The dry portion 14 can be designed and arranged to effect the desired mandatory fluid delivery delay, for example, by modifying or configuring the system volume, pipe distance and/or pipe size. Because the fluid delivery delay period is preferably a function of fluid travel time following first sprinkler activation, the fluid delivery delay period is preferably a function of the trip time for the primary water control valve 16, the water transition time through the system, and compression. The dry portion 14 and its network of pipes preferably include a main riser pipe connected to the primary water control valve 16, and a main pipe 22 to which are connected one or more spaced-apart branch pipes 24. The network of pipes can further include pipe fittings such as connectors, elbows and risers, etc. to connect portions of the network and form loops and/or tree branch configurations in the dry portion 14. Accordingly, the dry portion 14 can have varying elevations or slope transitions from one section of the dry portion to another section of the dry portion. The sprinklers 20 are preferably mounted to and spaced along the spaced-apart branch pipes 24 to form a desired sprinkler spacing. The sprinkler-to-sprinkler spacing can be six feet-by-six feet (6 ft.×6 ft.); eight feet-by-eight feet (8 ft.×8 ft.); ten feet-by-ten feet (10 ft.×10 ft.); twelve feet-by-twelve feet (12 ft.×12 ft.); fifteen feet-by-fifteen feet (15 ft.×15 ft.); twenty feet-by-twenty feet (20 ft.×20 ft. spacing) and any combinations thereof or range in between, depending upon the system hydraulic design requirements.

Figure 1A:
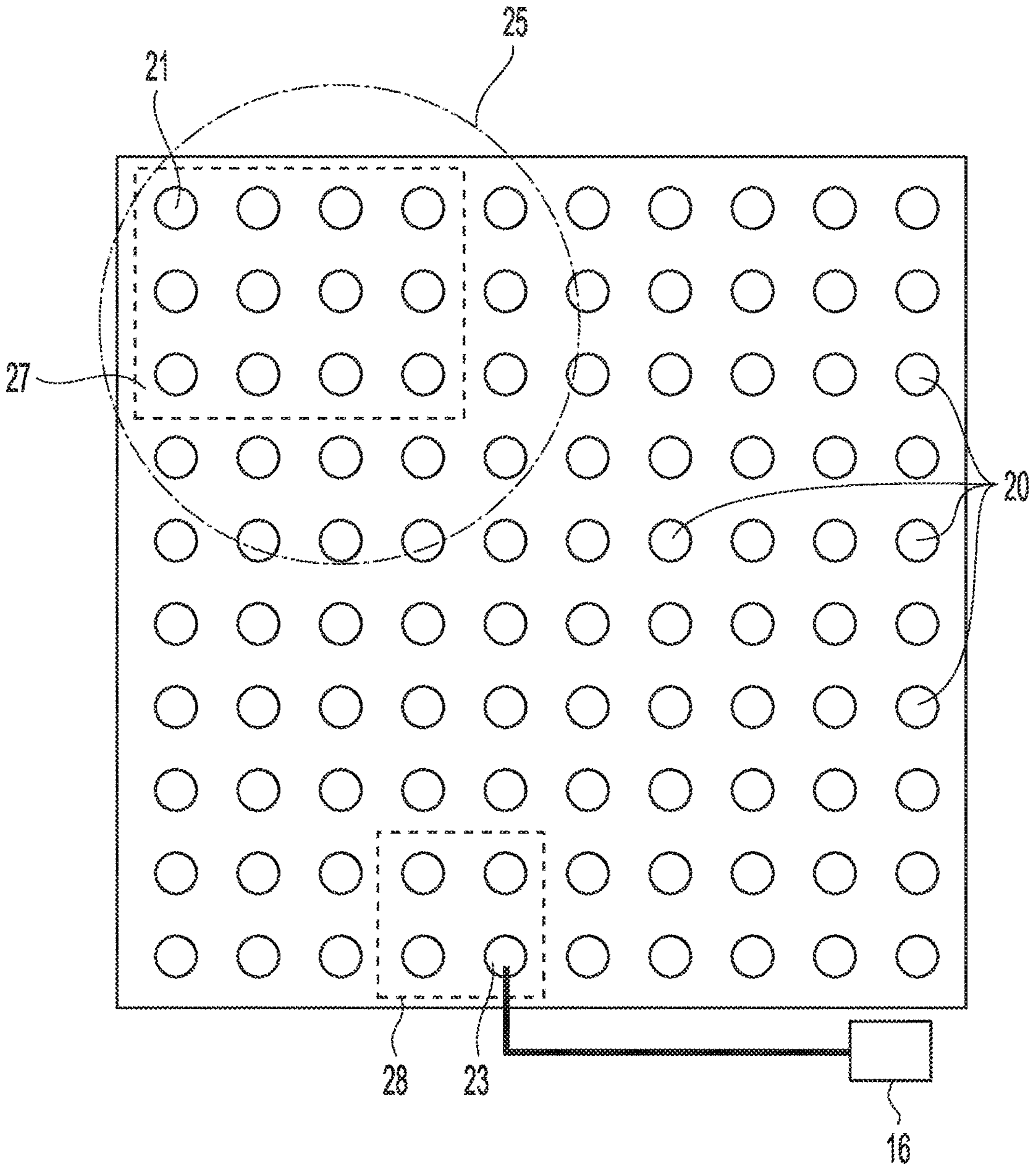
FIG. 1A is an illustrative schematic of the dry portion of the system of FIG. 1

Schematically shown in FIG. 1A, the dry sprinkler system 10 includes one or more hydraulically remote sprinklers 21 defining a preferred hydraulic design area 25 to support the system 10 in responding to a fire. The preferred hydraulic design area 25 is a sprinkler operational area designed into the system 10 to deliver a specified nominal discharge density D, from the most hydraulically remote sprinklers 21 at a nominal discharge pressure P. The system 10 is preferably a hydraulically designed system having a pipe size selected on a pressure loss basis to provide a prescribed water density, in gallons per minute per square foot, or alternatively a prescribed minimum discharge pressure or flow per sprinkler, distributed with a reasonable degree of uniformity over a preferred hydraulic design area 25. Based upon the configuration of the dry portion 14, the network of sprinklers 20 and the preferred hydraulic design area 25 includes at least one hydraulically remote or hydraulically most demanding sprinkler 21, i.e., sprinklers that place the greatest water demand on a system in order to provide a prescribed minimum discharge pressure or flow. The network of sprinklers 20 further includes at least one hydraulically close or hydraulically least demanding sprinkler 23 relative to the primary water control valve 16, i.e., the least remote sprinkler.

Preferably, the system 10 is configured so as to include a maximum mandatory fluid delivery delay period and a minimum mandatory fluid delivery delay period. The minimum and maximum mandatory fluid delivery delay periods can be selected from a range of acceptable delay periods. With reference to FIG. 1A, the maximum mandatory fluid delivery delay period is the period of time following thermal activation of the at least one hydraulically remote sprinkler 21 to the moment of discharge from the at least one hydraulically remote sprinkler 21 at system operating pressure. The maximum mandatory fluid delivery delay period is preferably configured to define a length of time following the thermal activation of the most hydraulically remote sprinkler 21 that allows the thermal activation of a sufficient number of sprinklers surrounding the most hydraulically remote sprinkler 21 that together form the maximum sprinkler operational area 27 for the system 10 to preferably surround and drown a fire growth 72 as schematically shown in FIG. 1. In a preferred embodiment, the maximum fluid delivery delay period is the period of time following thermal activation that assures a preferred minimum operating pressure is available at each of the most hydraulically remote four sprinklers.

The minimum mandatory fluid delivery delay period is the period of time following thermal activation to the at least one hydraulically close sprinkler 23 to the moment of discharge from the at least one hydraulically close sprinkler 23 at system operating pressure. The minimum mandatory fluid delivery delay period is preferably configured to define a length of time following the thermal activation of the most hydraulically close sprinkler 23 that allows the thermal activation of a sufficient number of sprinklers surrounding the most hydraulically close sprinkler 23 to together form the minimum sprinkler operational area 28 for the system 10 effective to preferably surround and drown a fire growth 72. Preferably, the minimum sprinkler operational area 28, is defined by a critical number of sprinklers including the most hydraulically close sprinkler 23. The critical number of sprinklers can be defined as the minimum number of sprinklers that can introduce water into the storage area 70, impact the fire growth, yet permit the fire to continue to grow and trigger an additional number of sprinklers to form the desired sprinkler operational area 26 for preferably surrounding and drowning the fire growth. Alternatively or additionally, the minimum fluid delivery delay period assures that the minimum operating pressure is not available at any of the most hydraulically close four sprinklers (or least hydraulically demanding) within the minimum fluid delivery delay period.

With the maximum and minimum fluid delivery delay periods affected at the most hydraulically remote and close sprinklers 21, 23 respectively, each sprinkler 20 disposed between the most hydraulically remote sprinkler 21 and the most hydraulically close sprinkler 23 has a fluid delivery delay period in the range between the maximum mandatory fluid delivery delay period and the minimum mandatory fluid delivery delay period. Provided the maximum and minimum fluid delivery delay periods result respectively in the maximum and minimum sprinkler operational areas 27, 28, the fluid delivery delay periods of each sprinkler facilitates the formation of a sprinkler operational area 26 to address a fire growth 72.

The mandatory fluid delivery delay period of a sprinkler 20 is preferably a function of the sprinkler distance or pipe length from the primary water control valve 16 and can further be a function of system volume (trapped air) and/or pipe size. Alternatively, the fluid delivery delay period may be a function of a fluid control device configured to delay the delivery of water from the primary water control valve 16 to the thermally activated sprinkler 20. The mandatory fluid delivery delay period can also be a function of several other factors of the system 10 including, for example, the water demand and flow requirements of water supply pumps or other components throughout the system 10. To incorporate a specified fluid delivery delay period into the sprinkler system 10, piping of a determined length and cross-sectional area is preferably built into the system 10 such that the most hydraulically remote sprinkler 21 experiences the maximum mandatory fluid delivery delay period and the most hydraulically close sprinkler 23 experiences the minimum mandatory fluid delivery delay period. Alternatively, the piping system 10 can include any other fluid control device such as, for example, an accelerator or accumulator in order that the most hydraulically remote sprinkler 21 experiences the maximum mandatory fluid delivery delay period and the most hydraulically close sprinkler 23 experiences the minimum mandatory fluid delivery delay period.

Alternatively to configuring the system 10 such that the most hydraulically remote sprinkler(s) 21 experiences the maximum mandatory fluid delivery delay period and the most hydraulically close sprinkler(s) 23 experiences the minimum mandatory fluid delivery delay period, the system 10 can be configured such that each sprinkler in the system 10 experiences a fluid delivery delay period that falls between or within the range of delay defined by the maximum mandatory fluid delivery delay period and the minimum fluid delivery delay period. Accordingly, the system 10 may form a maximum sprinkler operational area 27 smaller than expected than if incorporating the maximum fluid delivery delay period. Furthermore, the system 10 may experience a larger minimum sprinkler operational area 28 than expected had the minimum fluid delivery delay period been employed.

Figure 2A:
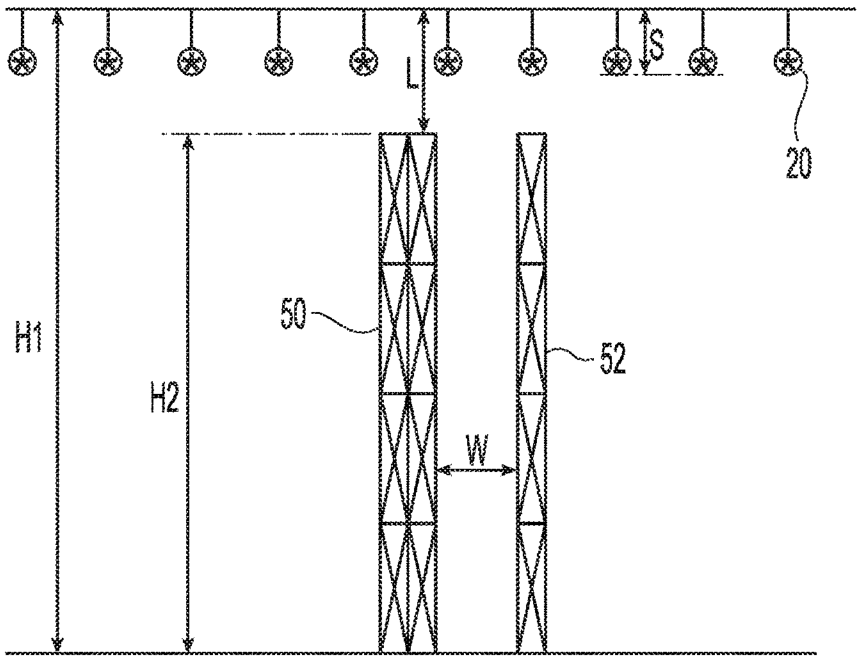
FIGS. 2A-2C are respective elevation, side and plan schematic views of the storage area of FIG. 1.
Figure 2B:
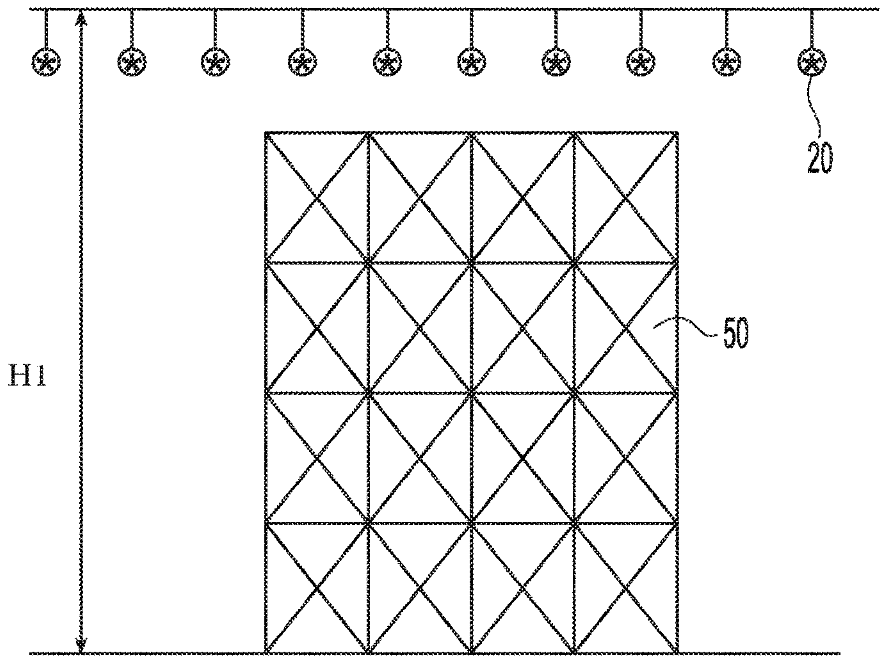
Figure 2C:
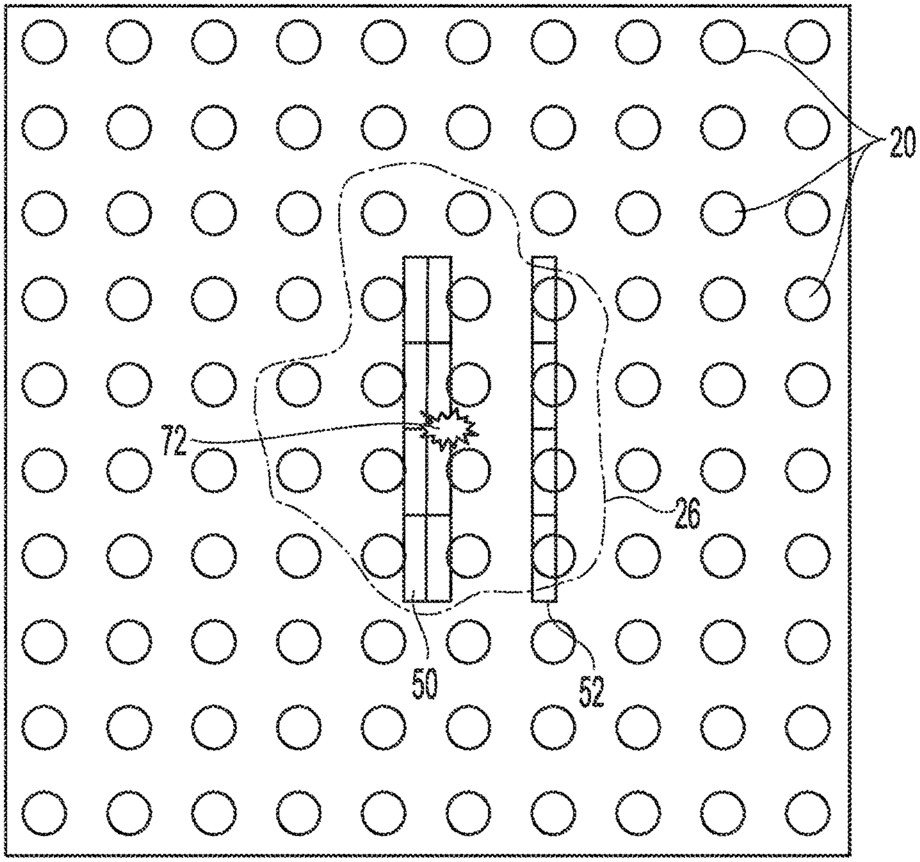

Shown schematically in FIGS. 2A-2C are respective elevation, side and plan views of the system 10 in the storage area 70 illustrating various factors that can impact fire growth 72 and sprinkler activation response. Thermal activation of the sprinklers 20 of the system 10 can be a function of several factors including, for example, heat release from the fire growth, ceiling height of the storage area 70, sprinkler location relative to the ceiling, the classification of the commodity 50 and the storage height of the commodity 50. More specifically, shown is the dry sprinkler system 10 installed in the storage area 70 as a ceiling-only dry sprinkler system suspended below a ceiling having a ceiling height of H1. The ceiling can be of any configuration including any one of: a flat ceiling, horizontal ceiling, sloped ceiling or combinations thereof. The ceiling height is preferably defined by the distance between the floor and the underside of the ceiling above (or roof deck) within the area to be protected, and more preferably defines the maximum height between the floor and the underside of the ceiling above (or roof deck). The individual sprinklers preferably include a deflector located from the ceiling at a distance S.

Located in the storage area 70 is the stored commodity configured as a commodity array 50 preferably of a type C which can include any one of the following classes Class I, II, III or IV of commodities as is known in the fire protection industry, alternatively Group A, Group B, or Group C plastics, elastomers, and rubbers, or further in the alternative any type of commodity capable of having its combustion behavior characterized. Additionally or alternatively, the commodity can be classified under other known classifications known in the industry being any one of storage class 1, 2, 3, 4 and/or plastic commodity. In addition, the stored array 50 preferably defines a multi-row rack storage arrangement; more preferably a double-row rack storage arrangement but other storage configurations are possible such as, for example, high piled, solid piled, on floor, rack without solid shelves, palletized, bin box, shelf, or single-row rack storage. The storage area can also include additional storage 52 of the same or different commodity spaced at an aisle width Win the same or different configuration. The array 50 can be stored to a storage height 112 to define a ceiling clearance L. The storage height H2 preferably defines the maximum height of the storage. The storage height can be alternatively defined to appropriately characterize the storage configuration. Preferably the storage height H2 is twenty feet or greater and can preferably be twenty-five feet or greater, for example between thirty feet to thirty-five feet; forty feet to forty-five feet; fifty feet to fifty-five feet or more preferably up to and no more than sixty feet.

A preferred mandatory fluid delivery delay period along with the preferred hydraulic design area 25 can provide design criteria from which a dry sprinkler system can preferably be designed and constructed. More preferably, maximum and minimum mandatory fluid delivery delay periods along with the preferred hydraulic design area 25 can provide design criteria from which a dry sprinkler system can preferably be designed and constructed. For example, a preferred dry sprinkler system 10 can be designed and constructed for installation in a storage space 70 by identifying or specifying the preferred hydraulic design area 25 and fluid delivery delays for a given set of commodity parameters and storage space specifications.

Figure 3:
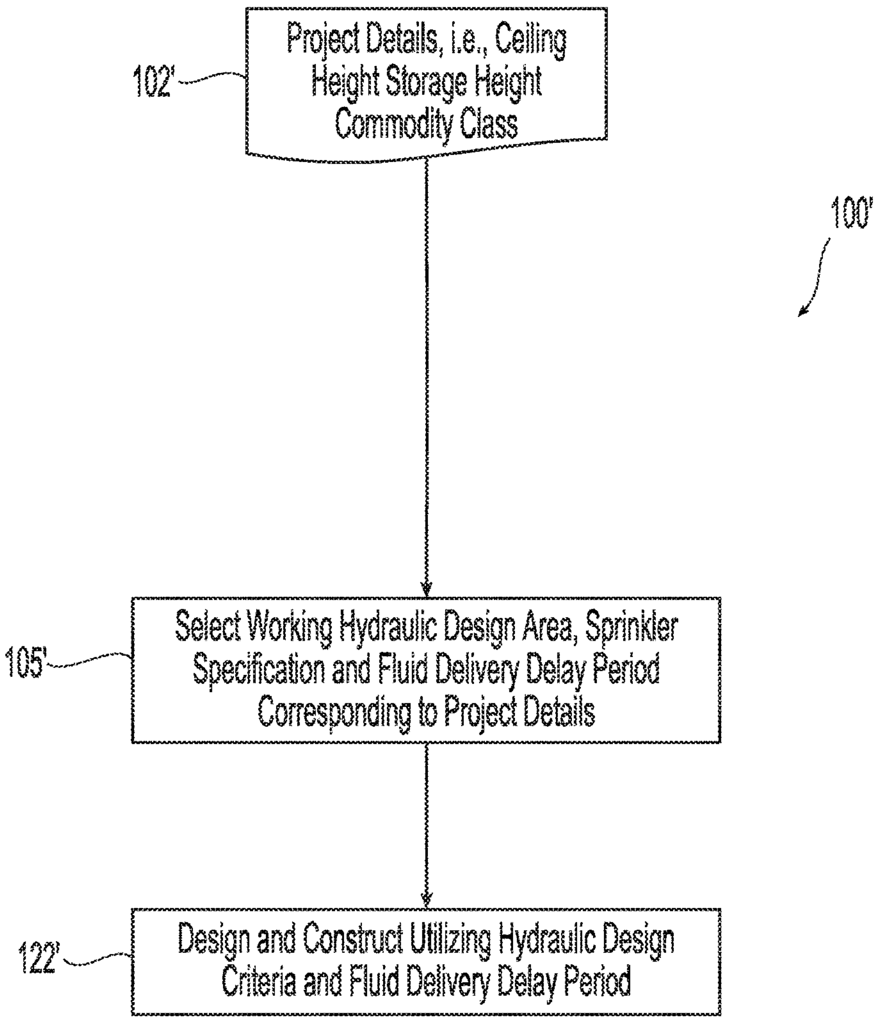
FIG. 3 is an illustrative flowchart for designing a preferred sprinkler system.

A preferred methodology for designing a fire protection system for protecting a commodity, equipment or other items located in a storage area includes establishing design criteria around which the preferred sprinkler system can be modeled, simulated and constructed. The design methodology preferably generally includes establishing at least three design criteria or parameters for the system 10: the preferred hydraulic design area 25, the minimum mandatory fluid delivery delay period, and the maximum mandatory fluid delivery delay period. In FIG. 3 is a preferred methodology 100' for designing and constructing a system 10. An initial step 102' provides for identifying and compiling project details such as, for example, parameters of the storage and commodity to be protected. These parameters preferably include the commodity class, the commodity configuration, the storage ceiling height. A preferred selection step 105' can be performed to identify and/or select a hydraulic design area and fluid delivery delay period including the minimum mandatory fluid delivery delay period, and the maximum mandatory fluid delivery delay period, each of which are preferably determined or proven effective to support and create a sprinkler operational area 26 for addressing a fire and protecting the storage occupancy and stored commodity configuration corresponding to the parameters compiled in the compiling step 102'. The identified hydraulic design areas and fluid delivery delay period can be implemented in a system design and construction step 122' for the construction of the ceiling-only dry sprinkler system capable of protecting the storage occupancy.

Figure 4:
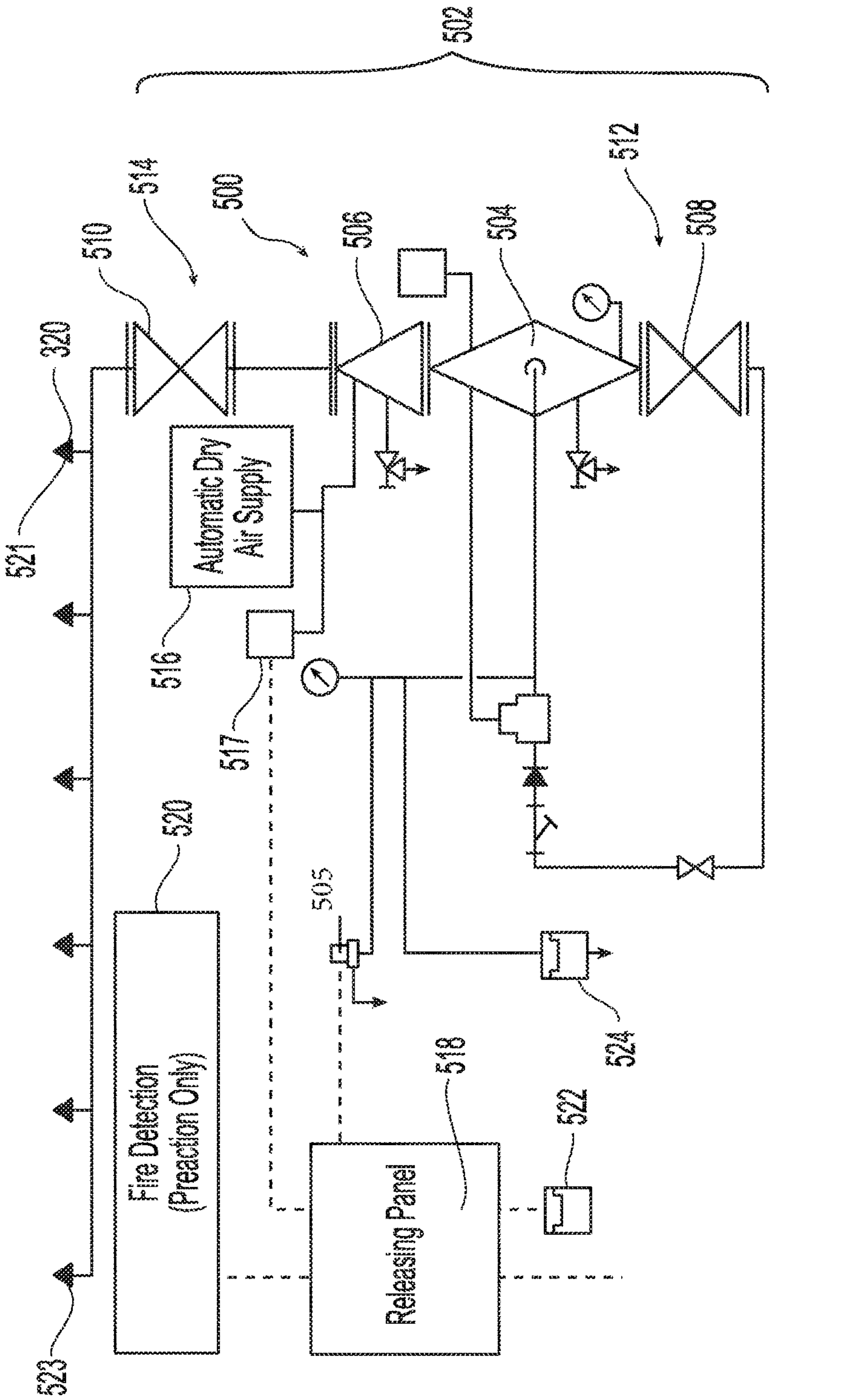
FIG. 4 is a schematic view of a riser assembly installed for use in the system of FIG. 1.
Figure 4A:
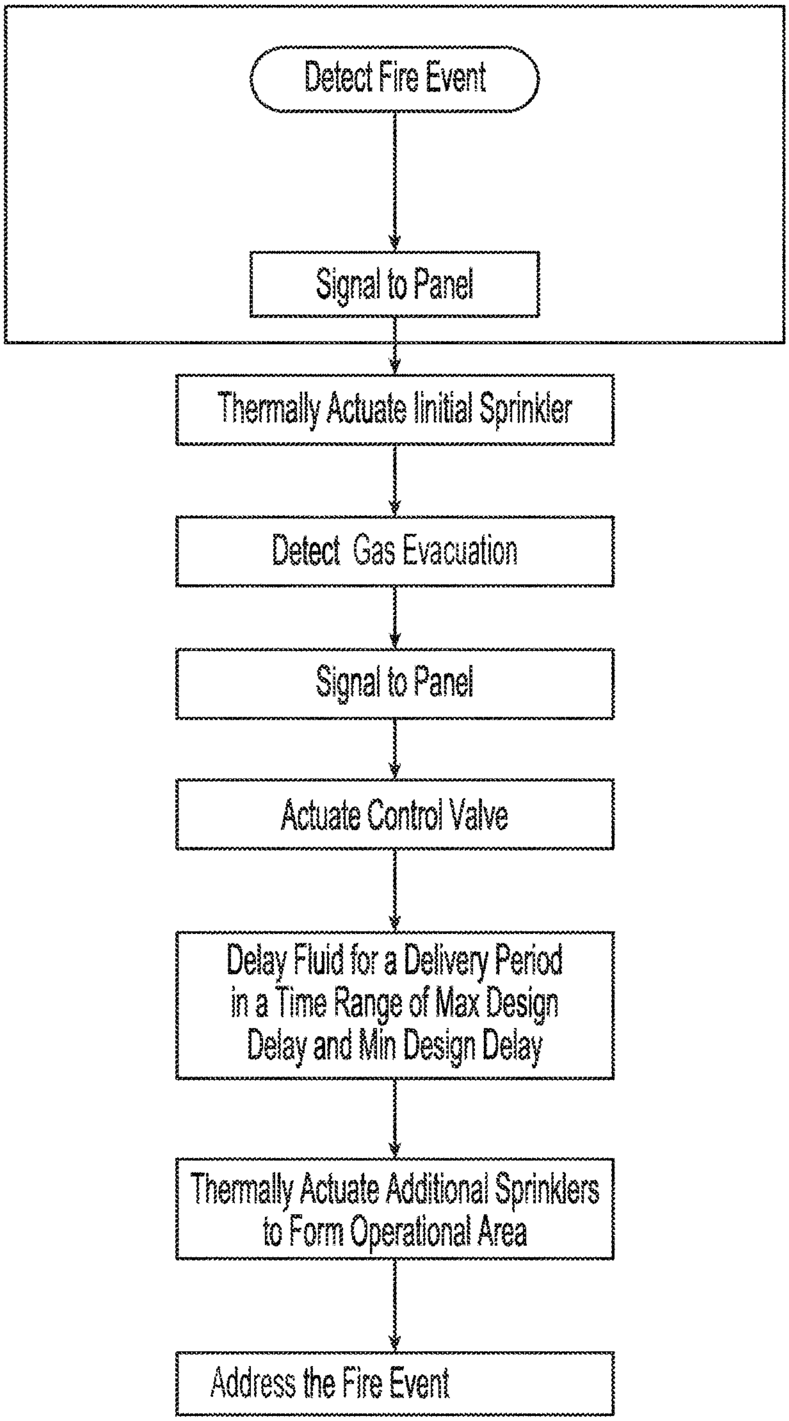
FIG. 4A is an illustrative operation flowchart for the system and riser assembly of FIG. 4.

Respectively schematically shown in FIG. 4 and FIG. 4A is a preferred embodiment of the system 500 and its preferred method of operation for ceiling-only protection of a storage occupancy to address a fire event. Preferably, the system 500 includes a riser assembly 502 to provide controlled communication between a fluid or wet portion 512 the system 500 and the preferably dry portion of the system 514. The riser assembly 502 preferably includes a control valve 504 for controlling fluid delivery between the wet portion 512 and the dry portion 514. More specifically, the control valve 504 includes an inlet for receiving the fire-fighting fluid from the wet portion 512 and further includes an outlet for the discharge of the fluid. Preferably, the control valve 504 is a solenoid actuated deluge valve actuated by solenoid 505, but other types of control valves can be utilized such as, for example, mechanically or electrically latched control valves. Further in the alternative, the control valve 504 can be an air-over-water ratio control valve, for example, as shown and described in U.S. Pat. No. 6,557,645. One type of preferred control valve is the MODEL DV-5 DELUGE VALVE from Tyco Fire & Building Products, shown and described in the Tyco data sheet TFP1305, entitled, "Model DV-5 Deluge Valve, Diaphragm Style, 1½ thru 8 Inch (DN40 thru DN200, 250 psi (17.2 bar) Vertical or Horizontal Installation" (March 2006). Adjacent the outlet of the control valve is preferably disposed a check-valve to provide an intermediate area or chamber open to atmospheric pressure. To isolate the deluge valve 504, the riser assembly further preferably includes two isolating valves disposed about the deluge valve 504. One type of isolating valve can be a riser check valve 506, such as for example, the Model CV-1FR Riser Check Valve shown and described in the Tyco data sheet TFP950, entitled "Model CV-1FR Grooved-End Riser Check Valves 2 to 12 Inch (DN50 to DN300)" (July 2004). Other diaphragm control valves 504 that can be used in the riser assembly 502 are shown and described in U.S. Pat. Nos. 6,095,484 and 7,059,578.

The dry portion 514 of the system 500 preferably includes a network of pipes having a main and one or more branch pipes extending from the main for disposal above a stored commodity. The dry portion 514 of the system 500 is further preferably maintained in its dry state by a pressurized air source 516 coupled to the dry portion 514. Spaced along the branch pipes are the sprinklers qualified for ceiling-only protection in the storage occupancy, such as for example, the preferred sprinkler 320. Preferably, the network of pipes and sprinklers are disposed above the commodity so as to define a minimum sprinkler-to-storage clearance and more preferably a deflector-to-storage clearance of about thirty-six inches. Wherein the sprinklers 320 are upright sprinklers, the sprinklers 320 are preferably mounted relative to the ceiling such that the sprinklers define a preferred deflector-to-ceiling distance, such as for example, seven inches (7 in.). Alternatively or additionally, the sprinklers are mounted to effect a deflector-to-top of storage minimum clearance, such as for example, thirty-six inches (36 in.). Alternatively or additionally, the sprinklers are mounted to locate the thermal trigger of the sprinkler 320 at a preferred trigger-to-ceiling distance that preferably ranges from two-to-twelve inches (2-12 in.).

The dry portion 514 can include one or more cross mains so as to preferably define a tree configuration or alternatively define a gridded or looped system configuration. The sprinkler-to-sprinkler spacing can preferably range from a minimum of about eight feet (8 ft.) for all construction to a maximum of about twelve feet (12 ft.) for unobstructed non-combustible construction, and is more preferably about ten feet (10 ft.) for combustible obstructed construction. Accordingly, the dry portion 514 can be configured with a hydraulic design area less than current dry fire protection systems specified under NFPA 13. Preferably, the dry portion 514 is configured so as to define a coverage area on a per sprinkler bases ranging from about eighty square feet (80 $ft.^2$) to about one hundred square feet (100 $ft.^2$).

In the preferred systems and methods described, a mandatory fluid delivery delay following one or more initially thermally actuated sprinklers to permit a fire event to grow and further thermally actuate additional sprinklers to form a sprinkler operational area to preferably surround and drown and more preferably overwhelm and subdue the fire event. The fluid delivery from the wet portion 512 to the dry portion 514 is controlled by actuation of the control valve 504. To control actuation of the control valve 504, the system 500 preferably includes a releasing control panel 518 to energize the solenoid valve 505 to operate the control valve. Alternatively, the control valve can be controlled, wired or otherwise configured such that the control valve is normally closed by an energized solenoid valve and accordingly actuated open by de-energizing signal to the solenoid valve. The system 500 can be configured as a dry preaction system and is more preferably configured as a double-interlock preaction system based upon in-part, a detection of a drop in air pressure in the dry portion 514. To ensure that the solenoid valve 505 is appropriately energized in response to a loss in pressure, the system 500 further preferably includes a release or an accelerator device 517 to reduce the operating time of the control valve in a preaction system. The accelerator device 517 is preferably configured to detect a release or evacuation of pressure from the dry portion 514 to signal the releasing panel 518 to energize the solenoid valve 505. The accelerator device 517 has a preferred sensitivity, such as for example a decay rate of at least 0.1 psi per second (0.007 bar/sec.), to detect evacuation from a single open sprinkler regardless of its location relative the device 517. Moreover the accelerator device 517 can be a programmable device to program and effect an adequate mandatory fluid delivery delay period.

Where the system 500 is preferably configured as a dry double-interlock preaction system, the releasing control panel 518 can be configured for communication with one or more fire detectors 520 to inter-lock the panel 518 in energizing the solenoid valve 505 to actuate the control valve 504. Accordingly, one or more fire detectors 520 are preferably spaced from the sprinklers 320 throughout the storage occupancy such that the fire detectors operate before the sprinklers in the event of a fire. The detectors 520 can be any one of smoke, heat or any other type capable to detect the presence of a fire provided the detector 520 can generate signal for use by the releasing control panel 518 to energize the solenoid valve to operate the control valve 504. The system can include additional manual mechanical or electrical pull stations 522, 524 capable of setting conditions at the panel 518 to actuate the solenoid valve 505 and operate the control valve 504 for the delivery of fluid. Accordingly, the control panel 518 is configured as a device capable of receiving sensor information, data, or signals regarding the system 500 and/or the storage occupancy which it processes via relays, control logic, a control processing unit or other control module to send an actuating signal to operate the control valve 504 such as, for example, energize the solenoid valve 505.

Figure 5A:
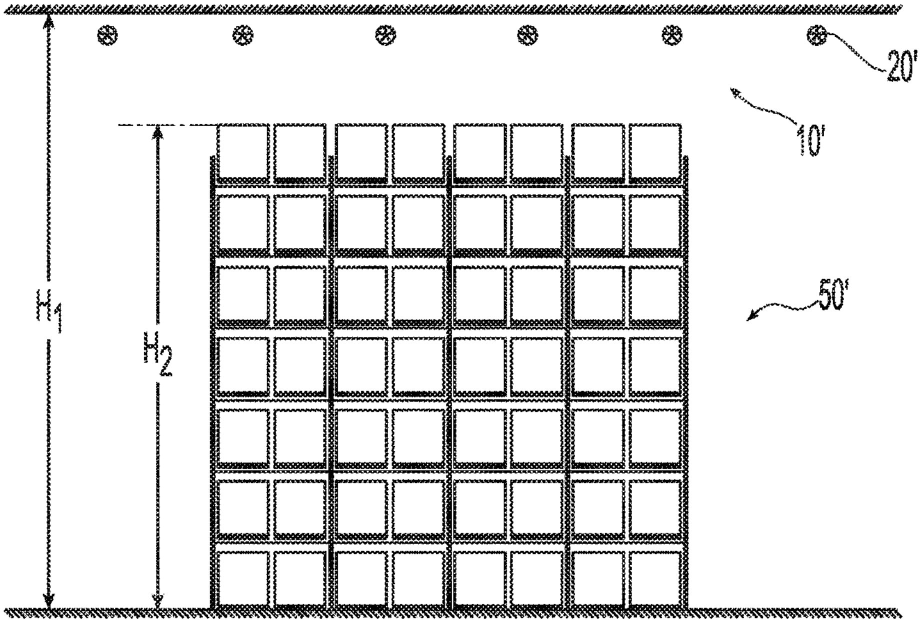
FIGS. 5A-5C are side, front and plan views of a preferred fire protection system.
Figure 5B:
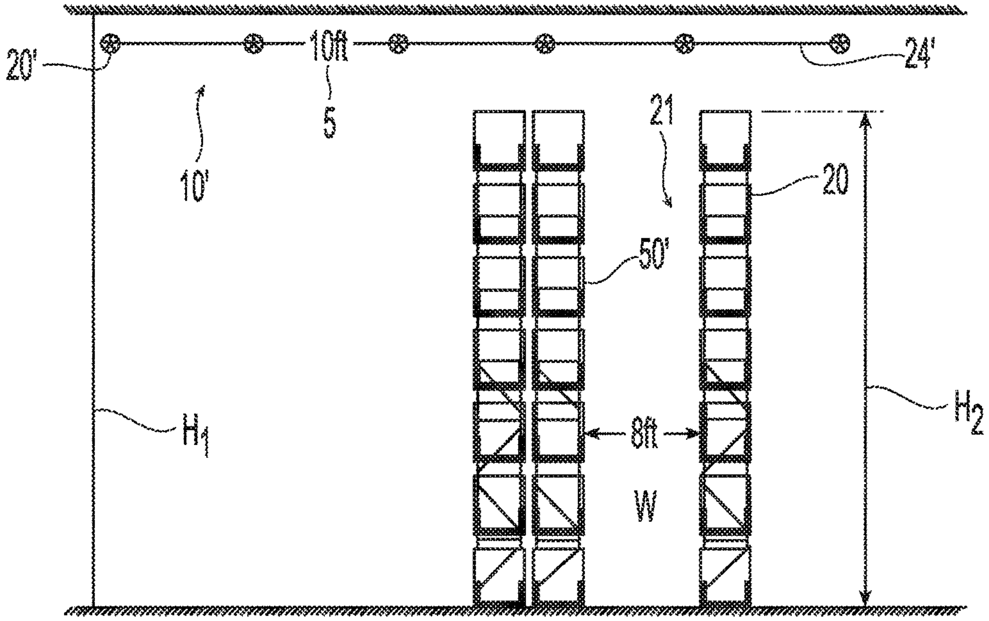
Figure 5C:
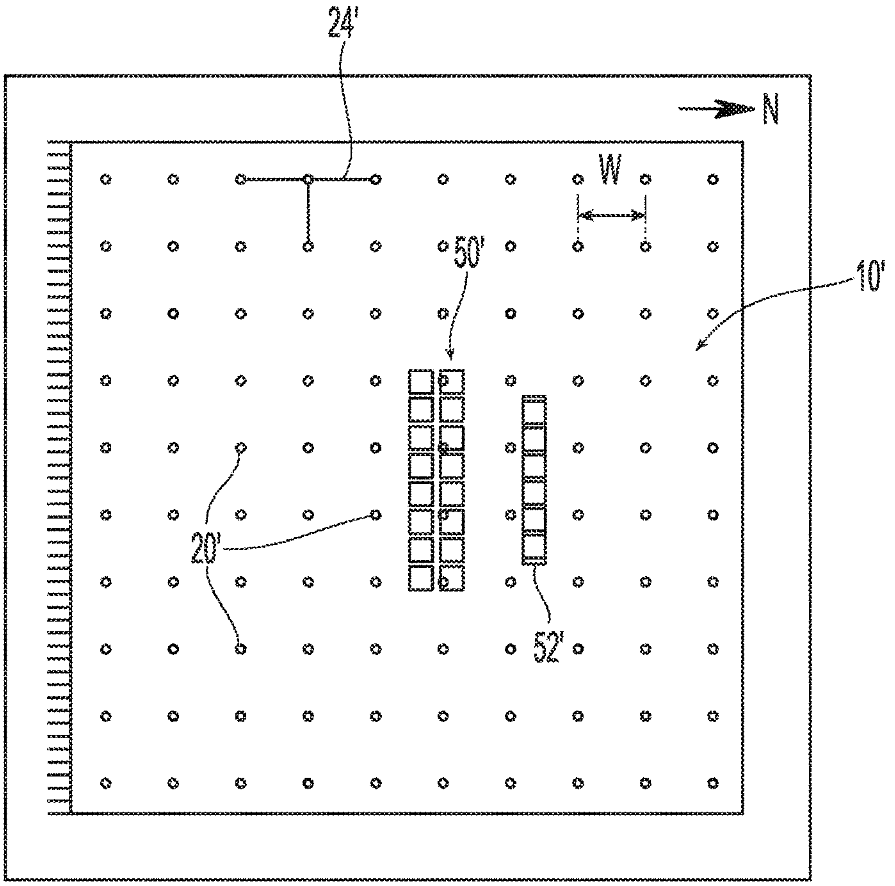

In connection with providing a preferred sprinkler for use in a dry ceiling-only fire protection system or alternatively in providing the system itself, the preferred device, system or method of use further provides design criteria for configuring the sprinkler and/or systems to effect a sprinkler operational area for effectively addressing a fire event in a storage occupancy. The preferred ceiling-only dry sprinkler system includes a sprinkler arrangement relative to a riser assembly to define one or more most hydraulically remote or demanding sprinklers and further define one or more hydraulically close or least demanding sprinklers. Schematically shown in FIG. 5A, FIG. 5B and FIG. 5C is a preferred fire protection system 10' for the protection of a storage occupancy. The system 10' includes a plurality of sprinklers 20' disposed over a protection area and beneath a ceiling having a nominal ceiling height H1 of fifty to sixty-five feet (50-65 ft.). Within the storage area is at least one, preferably multiple, rack 50' of a stored commodity stored to a nominal storage height ranging from forty-five to sixty feet (45-60 ft.). The commodity is preferably classified by hazard under a known industry standard, such as for example, NFPA-13, FM Global or International Fire Code (IFC). Under NFPA-13 commodity classes can include: Class I, Class II, and/or Class III. Stored commodities can further include Class IV and/or Group A, Group B, and Group C plastics or categories. Additionally or alternatively, the commodity can be classified under property insurer, FM Global, classifications being any one of storage class 1, 2, 3, 4 and/or plastic commodity. The rack 50' is located between the protection area and the plurality of sprinklers 20'. The system 10' includes a network of pipes 24' that are configured to supply water to the plurality of sprinklers 20'. The network of pipes 24' is preferably designed to deliver water to the hydraulic design area as previously described. The network of pipes 24' are preferably filled with a pressurized gas until at least one of the sprinklers 20' is activated or a primary control valve is actuated.

In an illustrative aspect of providing a device and method of fire protection, a sprinkler is preferably obtained for distribution and/or use in a ceiling-only, preferably dry sprinkler fire protection system for the protection of a storage occupancy. More specifically, preferably obtained is a sprinkler 20' qualified for use in a dry ceiling-only fire protection system for a storage occupancy 70 over a range of available ceiling heights H1 for the protection of a stored commodity 50' having a range of classifications and range of storage heights H2. More preferably, the sprinkler 20' is listed by an organization approved by an authority having jurisdiction such as, for example, NFPA or UL for use in a dry ceiling-only fire protection system for fire protection of, for example, any one of at least Class I, II, and III commodity ranging in storage height from about twenty feet to about sixty feet (20-60 ft.). Even more preferably, the sprinkler 20' is qualified for use in a dry ceiling-only fire protection system, such as sprinkler system 10 described above, configured to address a fire event with a surround and drown effect.

Obtaining a sprinkler for use in the system 10 can more specifically include designing, manufacturing and/or acquiring the sprinkler for use in a dry ceiling-only fire protection systems and methods herein. The sprinkler 20 for use in the system and methods described herein is preferably configured as an upright sprinkler. A preferred upright sprinkler 200 and aspects thereof for use in the systems and methods herein is shown in FIGS. 7A-7H. Additional details of the preferred sprinkler are shown and described in PCT International Patent Application Publication WO 2016/196836. The preferred upright-type fire protection sprinkler 200 includes a frame 202 having a body 204 an internal passageway 206 that extends between an inlet 208 and an outlet 210. Cooperating threads provided on the outside surface of the body 204 in the region of the inlet 208 permit the sprinkler to be coupled to a supply pipe, for delivery of water or other firefighting fluid. The frame 202 preferably includes a pair of support arms 232, 234 extending generally distally away from the outlet to converge and form an apex 236 at the distal end 238 of the frame 202. A deflector 300 is supported by and preferably fastened to the distal end of the frame 202 so as to be axially spaced from the outlet to distribute a flow of fire-fighting fluid, e.g., water, from the outlet.

Figure 7A:
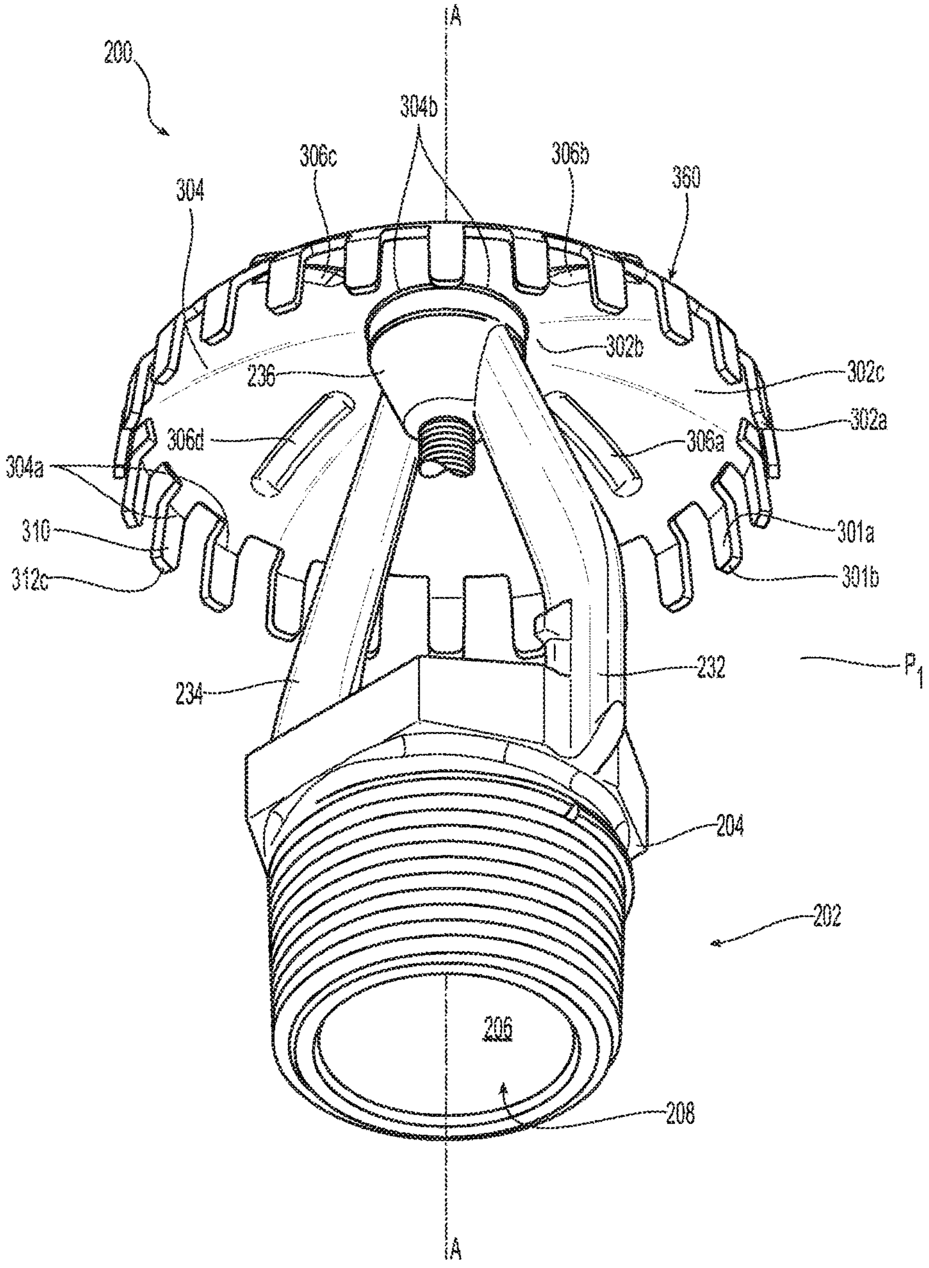
FIGS. 7A-7H are various views of a preferred embodiment of a sprinkler for use in the system of FIG. 1.
Figure 7B:
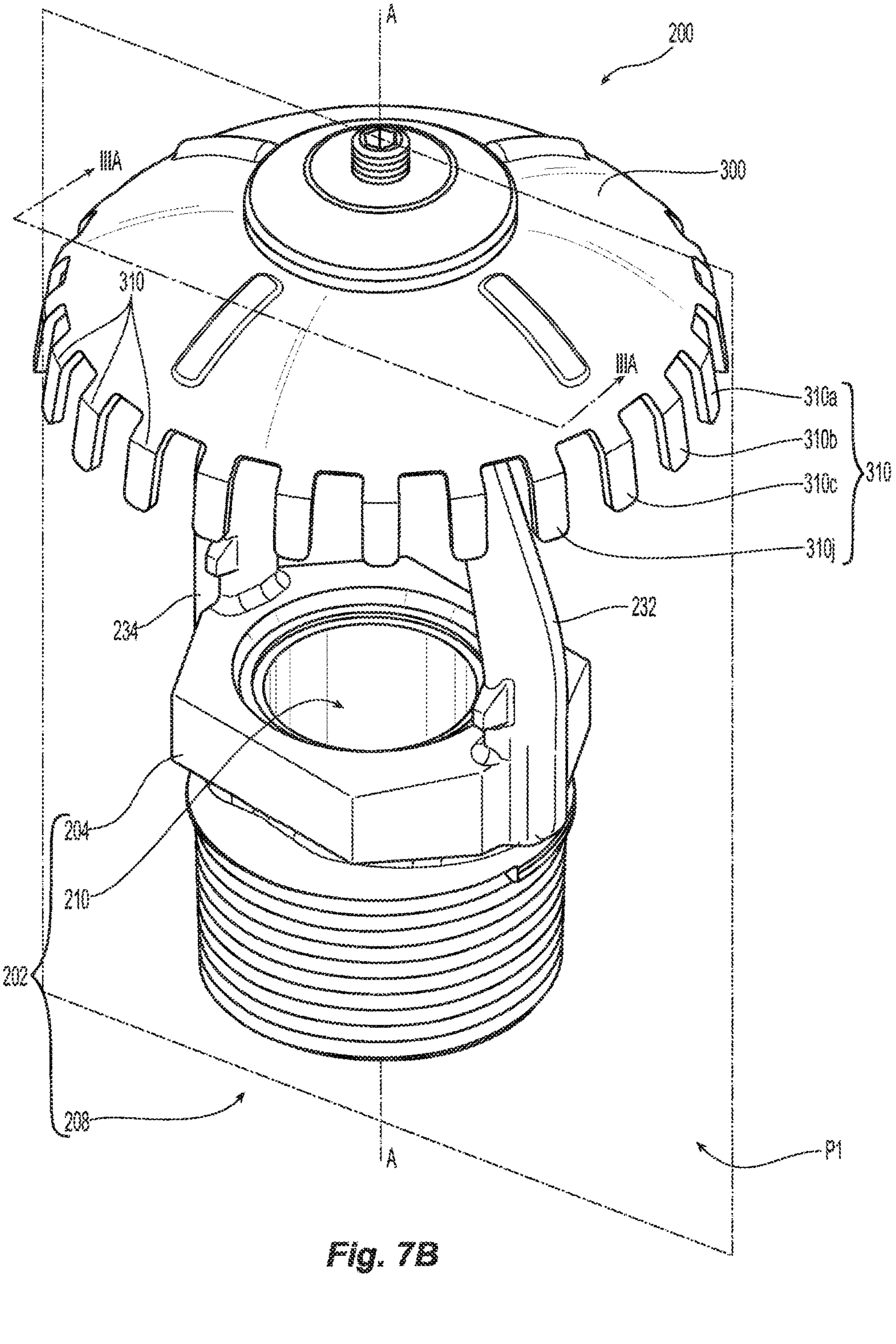
Figure 7C:
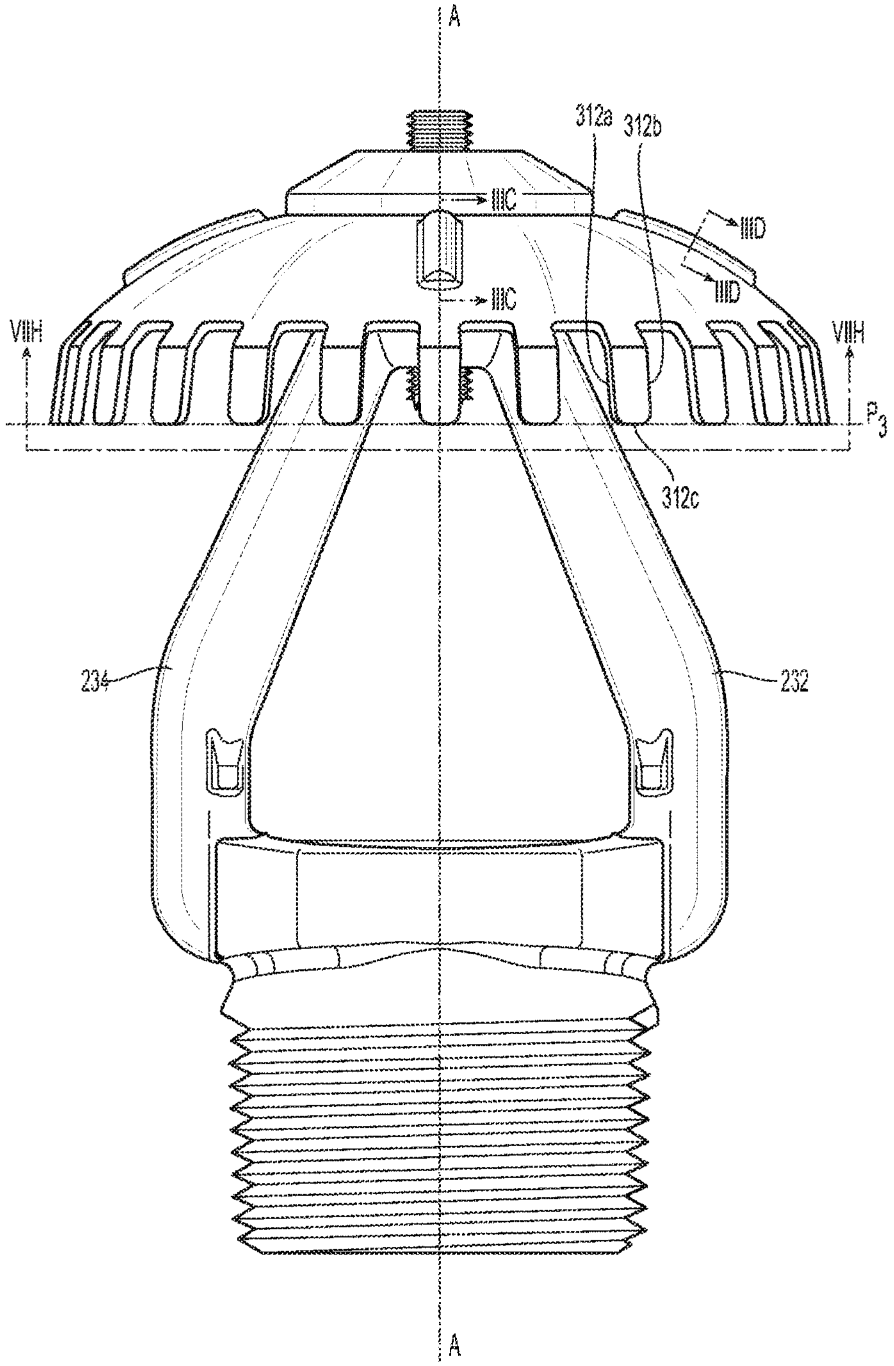
Figure 7D:
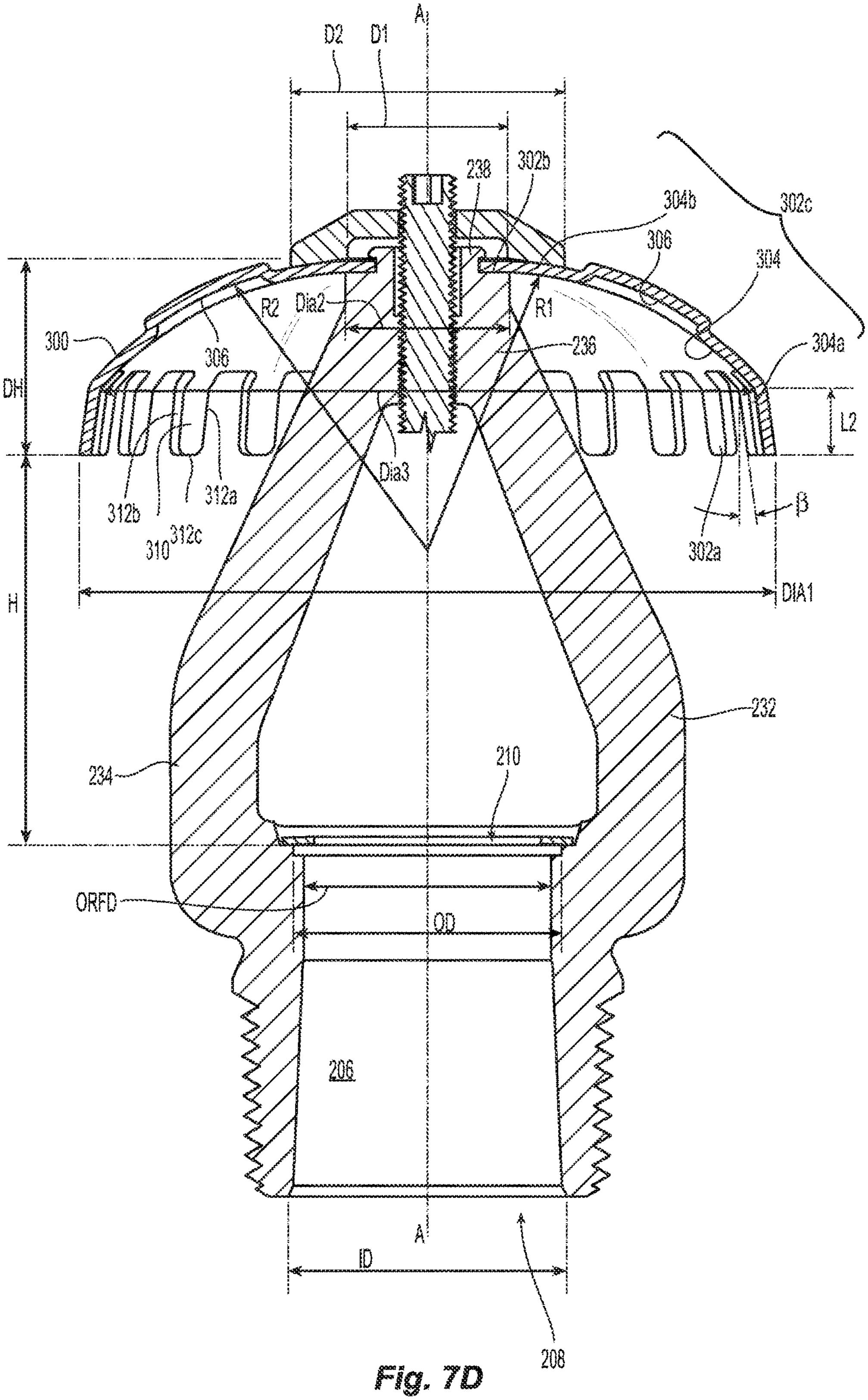

Referring to FIG. 7D, the deflector 300 has a preferably domed geometry having an inner surface 301*a* and an outer surface 301*b*. Water or other firefighting fluid discharged from the outlet 210 of the sprinkler frame 202 impacts the concave underside of the deflector 300 for distribution about and below the sprinkler assembly 200. Preferably, the deflector 300 has a perimeter portion 302*a* and a central portion 302*b* spaced further from the outlet than the perimeter portion 302*a* defining a central axis of the deflector axially aligned along the sprinkler axis A-A with an intermediate region 302*c* extending between the peripheral and central regions 302*a*, 302*b*. Preferred embodiments of the deflector 300 include one or more deflecting surfaces for distribution of water or other firefighting fluid about and below the sprinkler assembly 300. In a preferred embodiment, the intermediate region 302*c* includes a primary deflecting surface 304 defined by a spherical radius of curvature R1 with the center of curvature preferably located along the central axis of the deflector member 300, which is coaxially aligned with the sprinkler axis A-A. The radius of curvature R1 is preferably 1.5 inches and more preferably 1.6 inches.

The preferred intermediate region 302*c* and primary deflecting surface 304 define a peripheral junction or boundary 304*a* with the peripheral region 302*a* and further define an internal junction or boundary 304*b* contiguous with the central region 302*b*. The preferred peripheral region 302*a* of the deflector member 300 includes a plurality of spaced apart tines 310. Each tine 310 defines a preferred length L2 of ranging 0.25-0.3 inch and is more preferably about 0.28 inch extending from the preferred peripheral junction 304*a* of the intermediate region 302*c*. Each tine 310 is preferably bent from the peripheral junction 304*a* to define a bend line and a preferred included angle β of 8°-10° and more preferably 8° with respect to a vertical parallel to the sprinkler axis A-A, as seen for example in FIG. 3A. Each tine 310 also preferably includes a pair of lateral edges 312*a*, 312*b* which extend to preferably terminate at a substantially linear edge 312*c* that is disposed contiguously with and preferably substantially perpendicular to each of the lateral edges 312*a*, 312*b*. The transition from the lateral edges 312*a*, 312*b* to the linear edge 312*c* can be defined by a radiused corner of about 0.05 inch. The linear edges 312*c* of the tines 310 collectively define a discontinuous peripheral edge of the deflector 300 and its peripheral region 302*a* that substantially circumscribes the sprinkler axis A-A and is preferably disposed in a common plane P3, as seen in FIG. 7C, that extends perpendicular to the sprinkler axis A-A.

Figure 7E:
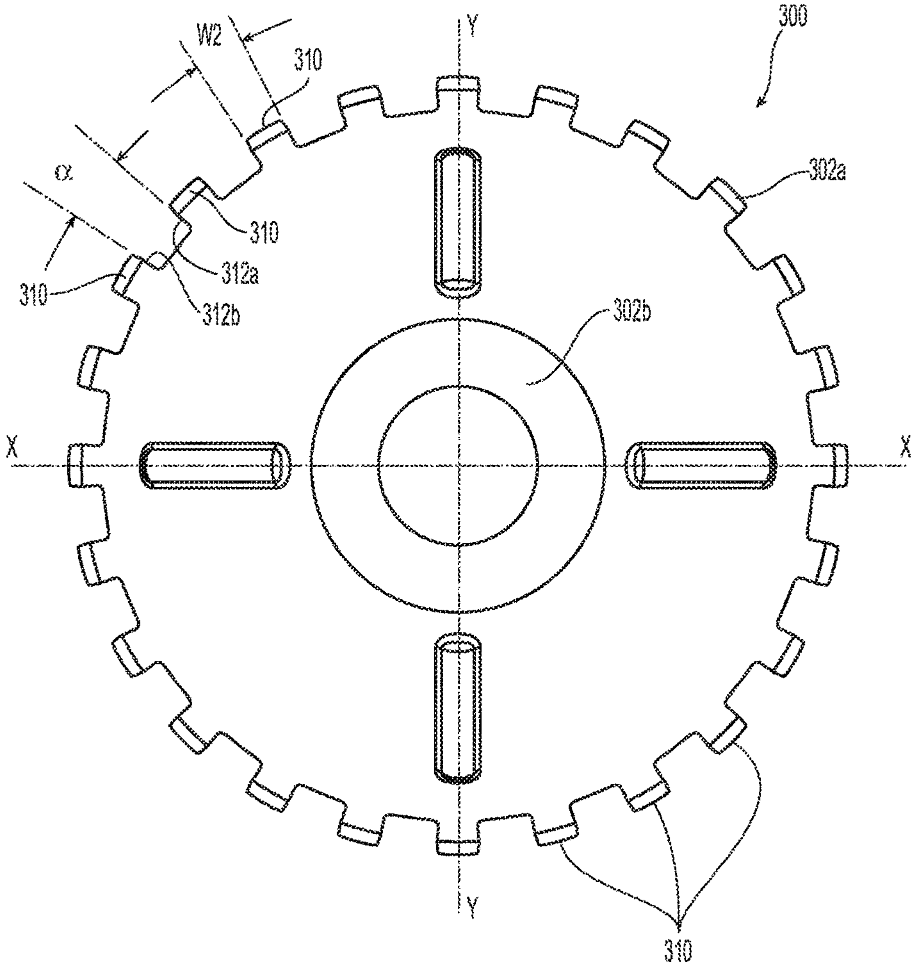

With reference to FIG. 7E, the preferred embodiment of the deflector 300 and its peripheral region 302*a* is defined by twenty-four (24) equiangularly spaced apart tines 310 with adjacent lateral edges 312*a*, 312*b* spaced apart by an angle α of fifteen degrees (15°) with each tine 310 defining a width W2 preferably of about 0.15 inch. In the common plane P3, the terminal edges 312*c* define a substantial circular geometry. With reference to FIG. 7D, the maximum diameter Dia1 in a preferred embodiment of the deflector 300 is about three inches and the internal junction 304*b* defines an internal diameter Dia2 of about 0.75 inch with the peripheral junction 304*a* defining another internal diameter Dia3 ranging from 2¾ inches (2.75 in.) to less than 3 inches. The total height DH of the preferred deflector member 300 axially measured from the outer surface of the central region 302*b* to the common plane P3 is over ¾ of an inch and more preferably ranges from ⅞ inch (0.875 in.) to one inch and is more preferably ⅞ inch (0.875 in.).

Figure 7F:
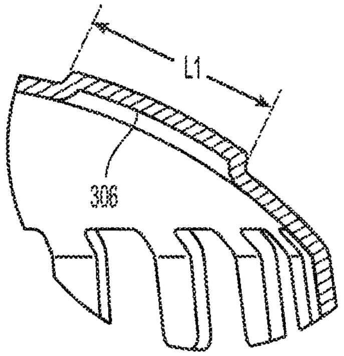
Figure 7G:
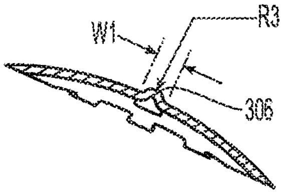
Figure 7H:
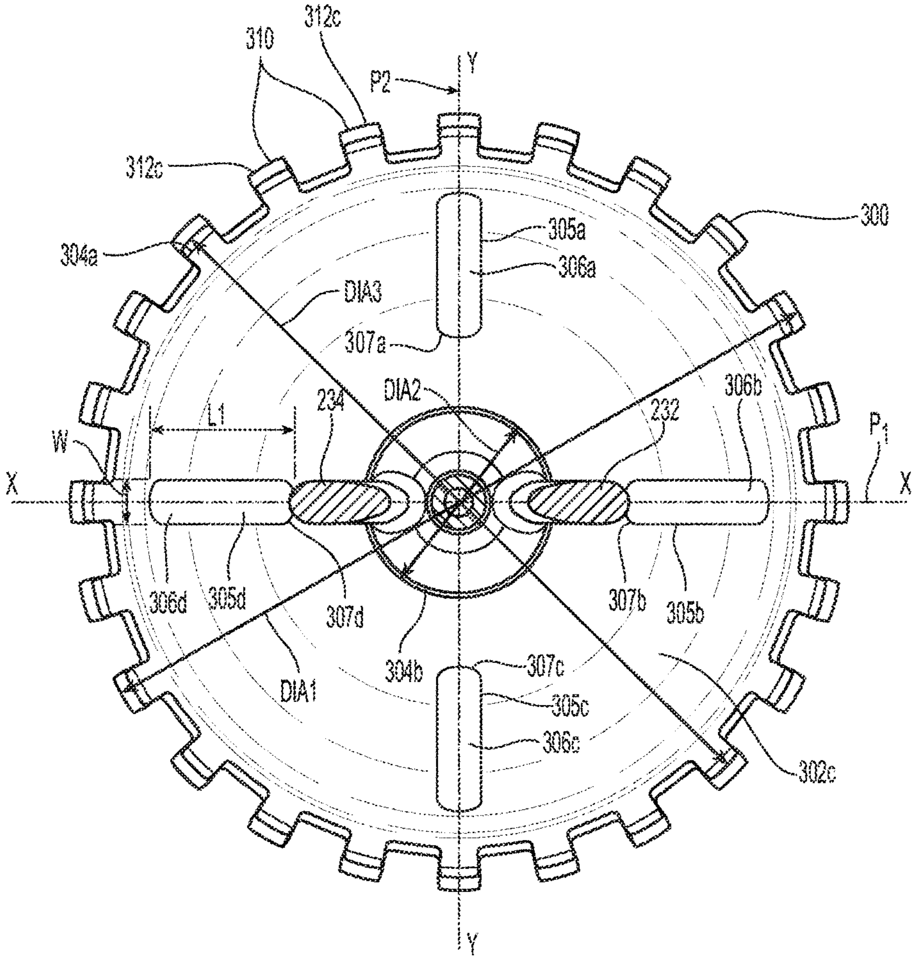

In a preferred embodiment, the intermediate region 302*c* includes one or more secondary deflecting surfaces 306 and a transition from the primary deflecting surface 304 to the secondary deflecting surface 306. As shown in FIG. 7H, four secondary deflecting surfaces 306*a*, 306*b*, 306*c*, 306*d* are preferably formed and equiangularly spaced about the central region 302*b* and more preferably formed and equiangularly spaced about the primary deflecting surface 304. In the preferred embodiment, the secondary deflecting surfaces 306*a*, 306*b*, 306*c*, 306*d* are elongate formations extending radially in the direction of perpendicular axes X-X, Y-Y, that are disposed respectively in perpendicular planes P1, P2, which divide the deflector member 300 into substantially equal part quadrants. Accordingly, the four secondary deflecting surfaces 306*a*, 306*b*, 306*c*, 306*d* are preferably spaced at 90 degrees from one another. Moreover, each of the secondary deflecting surfaces 306*a*, 306*b*, 306*c*, 306*d* is preferably equiradially spaced from the central region 302*b* of the deflector with diametrically opposed secondary deflecting surfaces (306*a*, 306*c*), (306*b*, 306*d*) having their radial inner ends 307*a*, 307*b*, 307*c*, 307*d* spaced at a preferred linear distance of about 1.3 inches from one another.

As seen in FIG. 7H, each of the secondary deflecting surfaces 306 is disposed between the peripheral and inner junctions 304*a*, 304*b* of the intermediate region 302*c*. Moreover, each of the secondary deflecting surfaces 306 is surrounded by a transition 305, which defines a perimeter 305*a*, 305*b*, 305*c*, 305*d* about each of the secondary deflecting surfaces 306*a*, 306*b*, 306*c*, 306*d* such that each secondary deflecting surface 306 and its perimeter 305 is surrounded by the primary deflecting surface 304. Referring to FIGS. 7D and 7F, each of the secondary deflecting surfaces 306 preferably extends in the direction of the axes X-X, Y-Y toward the sprinkler axis to define an arcuate profile that is substantially continuous and parallel to the radius of curvature of the primary deflecting surface 304. Thus, each of the preferred secondary deflecting surfaces is preferably formed to a radial depth R2 greater than the spherical radius R1. Moreover, each secondary deflecting surface 306 and its perimeter 305 define a preferred axial length L1, as seen in FIG. 7F, of about 0.5 inch and more preferably 0.6 inch. Accordingly in a preferred aspect, the perimeter or transition 305 about the secondary deflecting surface 306 is elongate, defining a width and a length with the length greater than the width. In cross-section, as seen in FIG. 7G, the secondary deflecting surfaces 306 form a substantially v-shaped groove preferably contiguous with the perimeter or transition 305 and have a preferred maximum width W1 of about 0.2 inch. In one preferred embodiment, the secondary deflecting surface 306 defines a radius of curvature R3 of about 0.075 inch in its cross-section profile relative to its axial length and the axis along which the elongate formation extends.

Referring to FIGS. 7D and 7H, the preferred central region 302*b* of the deflector is a substantially planar surface extending perpendicular to the sprinkler axis A-A. The central region 302*b* of the deflector 300 is preferably configured for engaging the distal end 238 of the sprinkler frame 202. The preferred deflector 300 is secured to the frame 202 to preferably orient the secondary deflecting surfaces 306*a*, 306*b*, 306*c*, 306*d* relative to the frame arms 232, 234. More specifically, as seen in FIG. 7H, the deflector 300 is preferably oriented to locate one diametrically opposed pair of secondary deflecting surfaces 306*b*, 306*d* and its axis X-X in the plane P1 aligned with the frame arms 232, 234. Accordingly, the second preferred pair of diametrically opposed secondary deflecting surfaces 306*a*, 306*c* and its axis Y-Y are preferably aligned in the second plane P2 perpendicular to plane P1. Each of the frame arms 232, 234 are preferably symmetrical about the plane P1 substantially along the axial length of the arms. The arms can define a variable cross-sectional area or profile along their length. The cross-sectional area may vary in size or, alternatively, the arms can include one or more formations along their length to vary the cross-sectional profile.

Referring to the cross-sectional view of the sprinkler assembly 200 in FIG. 7D, the internal passageway 206 defines a preferred length of about 1.540 inches from inlet 208 to outlet 210 with an internal bore diameter and more particularly an orifice diameter ORFD proximate the outlet 210. The orifice diameter ORFD preferably ranges from 1.05-1.1 inches and is more preferably 1.084 inches. The passageway 206 preferably varies for at least a portion along its length so as to taper narrowly in the direction from inlet 208 to outlet 210 with a preferably beveled edge at the inlet 208. The outlet 210 is preferably beveled with a preferred outlet diameter OD ranging from 1.15-1.2 inches and more preferably 1.175 inches.

A preferred upright specific application storage sprinkler has a K-factor ranging from about 11 to about 36 and more preferably has a K-factor of greater than 28. As is understood in the art, the nominal K-factor identifies sprinkler discharge characteristics, which is generally defined by the internal passageway of the sprinkler. A sprinkler's discharge characteristics can be identified by a nominal K-factor which is defined as an average flow of water in gallons per minute through the internal passageway divided by a square root of pressure of water fed into the inlet end of the internal passageway in pounds per square inch gauge: $Q=K\sqrt{P}$ where P represents the pressure of water fed into the inlet end of the internal passageway through the body of the sprinkler, in pounds per square inch gauge (psig); Q represents the flow of water from the outlet end of the internal passageway through the body of the sprinkler, in gallons per minute (gpm); and K represents the nominal K-factor constant in units of gallons per minute divided by the square root of pressure expressed in psig. The sprinklers 20 can be of any nominal K-factor provided they are installed and configured in a system to deliver a flow of fluid in accordance with the system requirements. More preferably, the fire protection sprinklers define a preferred nominal discharge coefficient or K-factor of greater than about 16.0. In preferred embodiments, the nominal K-factor can be between about 16.8 and about 28.0, preferably between about 22.4 and about 33.6, more preferably between about 25.2 and about 33.6, and most preferably is a nominal K-factor of 33.6 $GPM/(PSI)^{1/2}$. In addition, the sprinklers 20 preferably have an operating pressure greater than 40 psi, preferably ranging from about 40 psi. to about 65 psi., and is more preferably 50 psi. For preferred sprinklers described herein, the sprinklers define a minimum working pressure of 50 psi. for a preferred working flow of about 240 gpm and more preferably 238 gpm.

The preferred sprinkler 200 generates a desired spray pattern for use in the system 10. The desired spray pattern is realized by the deflector 300 defining at least one of the following preferred parameters: (i) an orifice diameter-to-spherical radius ratio (ORBD:R1) ranging from 0.65-0.75; (ii) a maximum deflector diameter-to-spherical radius ratio (Dia1:R1) ranging from 1.90-1.95; (iii) a maximum deflector diameter-to-total deflector height ratio (Dia1:DH) ranging from 3.45-3.55; and (iv) a spherical radius-to-total deflector height ratio (R1:DH) ranging from 1.80-1.85.

Alternatively or additionally, the means is defined by a preferred maximum deflector diameter-to-outlet diameter ratio (Dia1:OD) of about 2.6:1; and/or the orifice defines a preferred maximum deflector diameter-to-orifice diameter ratio (Dia1:ORFD) of about 2.8:1. In another preferred aspect, the preferred means of the deflector 100 includes a ratio of the maximum deflector diameter Dia1-to-spherical radius R1 to be about 2:1. Alternatively or additionally, the deflector 100 defines a maximum deflector diameter-to-deflector height ratio (Dia1:DH) of about 3.5:1.

Generally a desired spray pattern for use in the system 10 is non-circular, defined by a perimeter with two or more linear edges centrally or equidistantly disposed about the sprinkler 10. More preferably, the spray pattern is substantially rectangular and more preferably a square formed preferably within a ten foot-by-ten foot (10 ft.×10 ft.) perimeter centered about the sprinkler axis A-A in a plane preferably located about three to five feet below and more preferably four feet below the peripheral region 302*a* of the deflector 300 and perpendicular to the sprinkler axis A-A. Even more preferably, the spray pattern includes a high concentration of fluid distribution in the central area of the spray pattern with decreasing fluid distribution in the lateral outward direction away from the sprinkler axis A-A toward the perimeter of the substantially square pattern. Moreover, in one preferred aspect of the spray pattern, little to no fluid is distributed at or beyond six feet (6 ft.) from the sprinkler axis. Additionally, in the areas proximate to or along the edges of the preferably substantially square pattern, the fluid density preferably decreases in directions from the center of the edge toward the corners of the perimeter. In a preferred spray pattern, the areas adjacent and outside the corners of the ten-by-ten foot perimeter receive little to no fluid from the spray pattern.

Figure 8A:
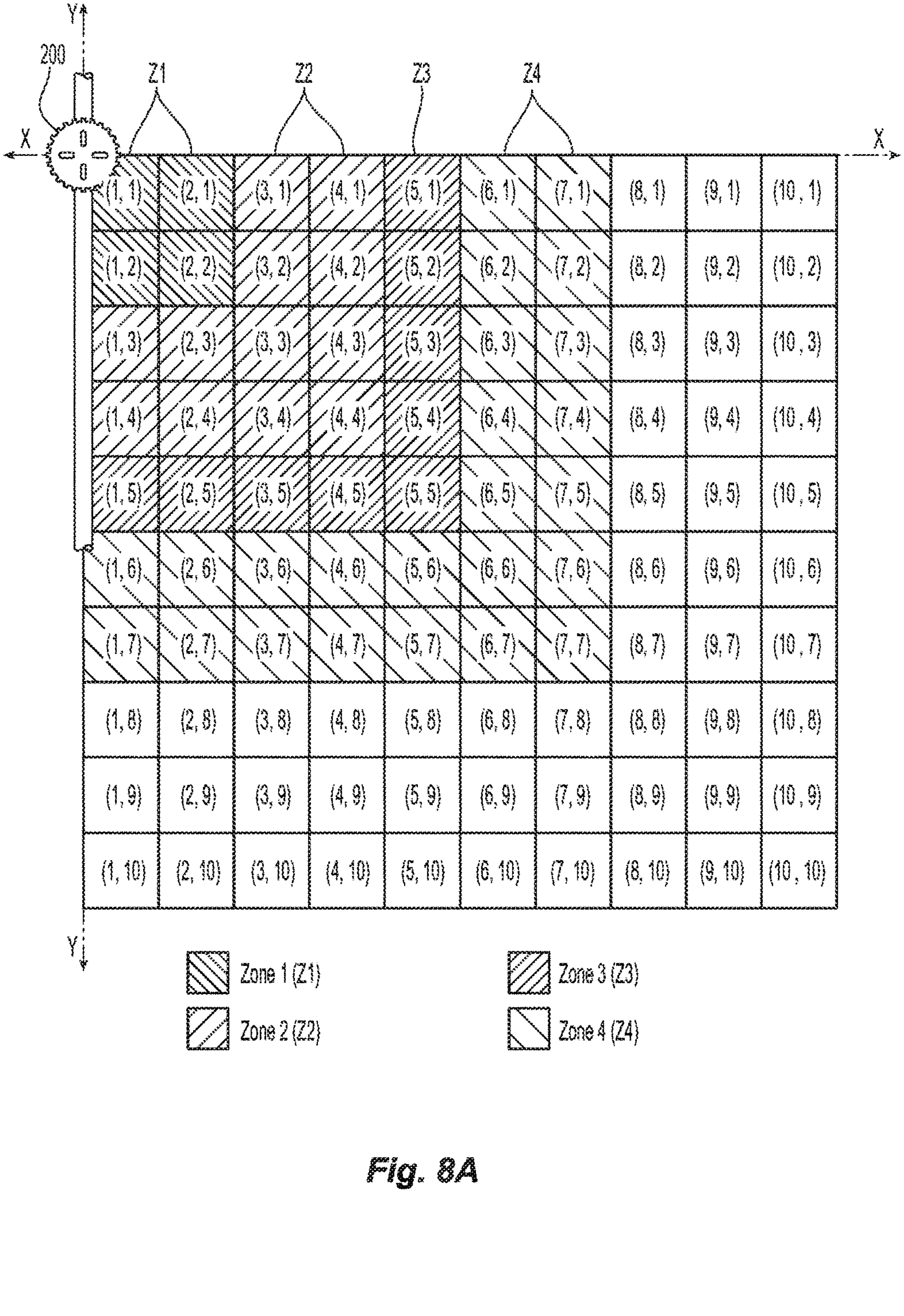
FIG. 8A is a graphic illustration of a preferred fluid distribution from the sprinkler of FIGS. 7A-7H.

In the exemplary desired distribution, water is discharged from the preferred sprinkler assembly 200 for a duration of about two minutes (2 min.) at a pressure of 30 psi, which translated to a discharge rate of about 184 gallons per minute (gpm) for the preferred K-33.6 sprinkler. The spray pattern is graphically shown in FIG. 8A over one quarter of a 20 ft.×20 ft. grid area (400 sq. ft.) beneath the assembly divided into one hundred one square foot areas. One corner of the 10 ft.×10 ft. grid array is centered beneath the sprinkler 10. Areas of the fluid distribution can be grouped into concentric substantially rectangular zones of a desired spray pattern. Zone 1 (Z1) is defined by the four collection areas (1,1); (1,2); (2,1); (2,2) below the sprinkler 10 which collect the central portion of the spray pattern. Zone 3 (Z3) is defined by the collection areas at the perimeter of the spray pattern (5,1); (5,2); (5,3); (5,4); (1,5) (2,5); (3,5); (4,4); and (5,5) in which collection pan (5,5) is located at the corner of the preferred spray pattern. Accordingly, the collection pans of Zone 3 (Z3) define the outline of a preferred non-circular and substantially square spray pattern. Zone 2 (Z2) is defined by the collection areas between Zone 1 (Z1) and Zone 3 (Z3). Zone 4 (Z4) is defined by the group of collection pans surrounding the preferred perimeter Z3. Zone 4 (Z4) preferably has a low concentration in fluid distribution corresponding to a drop in fluid distribution at the perimeter of the preferred spray pattern in Zone 3.

Generally, the preferred spray patter is bound by a non-circular perimeter defined by the L-shaped Zone 3 (Z3) of the quadrant. Zone 4 preferably amounts to less than five percent and is preferably zero of the total fluid distribution or density of the spray pattern. The water distribution of the spray pattern at the collection area (5,5) preferably reveals a distinct corner-like edge with the adjacent square foot areas in the fourth zone preferably having no fluid collected therein. The preferred spray pattern preferably includes a concentration of fluid density in the central portion of the spray pattern such that 30% to 35% of the total distribution is preferably within Zone 1 (Z1) and centered beneath the sprinkler 10. Moreover, of the four distribution square foot areas of Zone 1 (Z1) quadrant, three of the areas would collect at a density greater than any pan in the other three zones. The distribution density preferably decreases radially from the sprinkler 10 and at the perimeter of the preferred spray pattern with the distribution density in Zone 3 (Z3) preferably ranging from 40-60% of the density of Zone 1 (Z1) and more preferably ranging from 50-60% and even more preferably is about 58%.

Figure 9A:
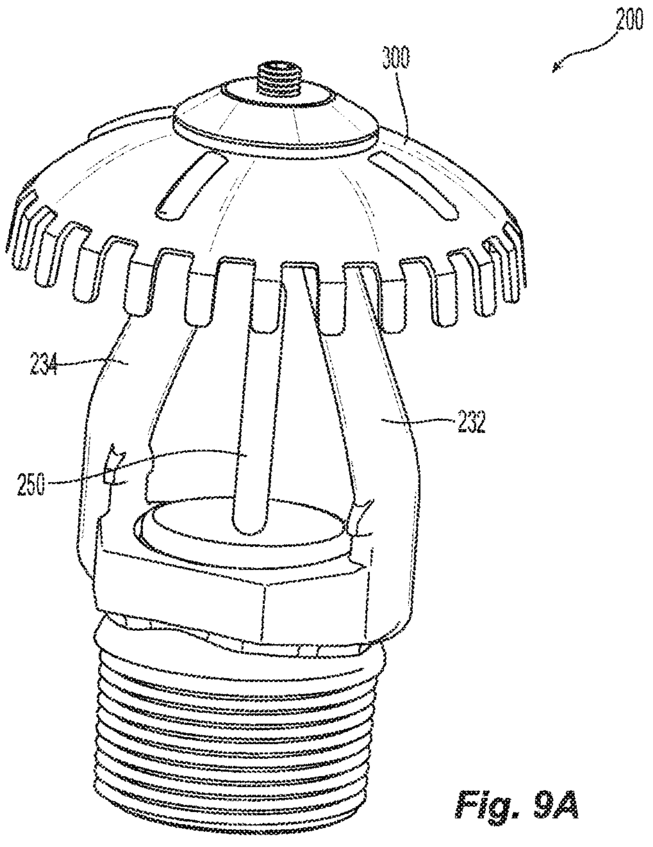
FIGS. 9A-9B are perspective views of alternate embodiments of the sprinkler of FIGS. 7A-7H.
Figure 9B:
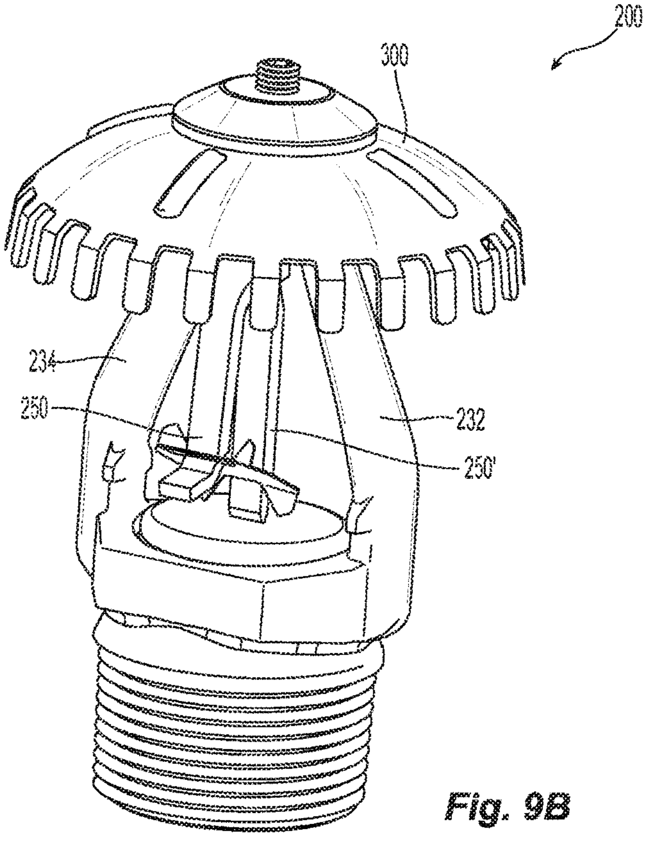

A sealing or closure assembly is disposed within the outlet of the sprinkler and supported in place by a preferably thermally rated trigger assembly 250 or trigger to maintain the sprinkler in an unactuated, standby or non-fire condition and control the discharge of fluid from the outlet. As shown in FIGS. 9A and 9B, the trigger assembly 250 is preferably configured as a bulb-type trigger assembly or may be alternatively configured as a lever and link arrangement. The heat-responsive trigger assembly and its actuation is defined by its nominal temperature rating and Response Time Index, or RTI. The trigger assembly is preferably thermally rated to a temperature at which the trigger assembly actuates to displace the closure or sealing assembly from the outlet 210 of the sprinkler 200 and permit discharge from the sprinkler body. The sprinklers 200 can be specified within a range of industry accepted temperature ratings and classifications as listed, for example, in Table 6.2.5.1 of NFPA-13, which includes: (i) ordinary 135° F.-170° F.; (ii) intermediate 175° F.-225° F.; (iii) high 250° F.-300° F.; (iv) extra high 325° F.-375° F.; (v) very extra high 400° F.-475° F.; and (vi) ultra high 500° F.-575° F. The trigger assembly has a preferred nominal temperature rating high 250° F.-300° F. and is more preferably has a temperature rating of 286° F. The heat-responsive trigger assembly and its actuation is further preferably defined by a Response Time Index, or RTI. The trigger assembly RTI, can range from at least 130 meter½sec½ (m½s½) to 160 meter½sec½ (m½s½), preferably ranges from at least 135 meter½sec½(m½s½) to about 160 meter½sec½ (m½s½), more preferably 150 meter½sec½ (m½s½) to about 160 meter½sec½ (m½s½), and is more preferably 160 meter½sec½ (m½s½). Alternatively, the RTI can range to 50 meter½sec½ (m½s½) or less so as to be a "quick" or "fast" response type sprinkler.

The preferred sprinkler defines a preferred operating or discharge pressure to provide a distribution of fluid to effectively address a fire event with the system 10. Preferably, the design discharge pressure ranges of the sprinkler ranges from about forty pounds per square inch to sixty-five pounds per square inch (40-65 psi), and more preferably is fifty pounds per square inch (50 psi.). The hydraulic design area 25 for the system 10 is preferably designed or specified in terms of number of design sprinklers for a given commodity and storage ceiling height to the most hydraulically remote sprinklers or area in the system 10. In preferred embodiments of the system and methods described herein, a dry sprinkler system for the protection of storage commodities having a hazard classification of Class III, its equivalent or less, beneath a ceiling height of over forty-five feet to sixty-five feet is hydraulically supported by six to eighteen (6-18) design sprinklers, preferably no more than sixteen sprinklers which, based upon their sprinkler-to-sprinkler spacing and individual coverage, define a hydraulic design area 25. In preferred embodiments of the system, the design area 25 is preferably less than 2500 sq. ft. In preferred embodiments of the system, the design area 25 can range from 600 sq. ft. to 2500 sq. ft. More preferably, the design area 25 ranges from 1200 sq. ft. to 1800 sq. ft. One preferred embodiment of the systems and methods includes a hydraulic design area 25 ranging from ten to eighteen (10-18) design sprinklers. Preferably, the hydraulic design area 25 ranges from twelve to eighteen (12-18) design sprinklers. The hydraulic design area 25 can range from twelve to sixteen (12-16) design sprinklers. The hydraulic design area 25 can range from twelve to fifteen (12-15) design sprinklers. More preferably, the hydraulic design area 25 is one of fifteen or sixteen design sprinklers. An alternate embodiment of the system and method can include a hydraulic design area of six to ten (6-10) design sprinklers. Accordingly, preferred embodiments of the system and methods herein can include a design area defined by a minimum of six design sprinklers or a maximum of sixteen sprinklers.

The preferred area of design sprinklers preferably include an array of four most hydraulically remote sprinklers located on adjacent branch pipes in the piping network tied to a common feed main. Given the commodity and ceiling heights, it is believed that the preferred design areas present a reduced hydraulic demand even as compared to the hydraulic demands designed under previously known system installation designs or standards including systems and methods employing a designed fluid delivery delay. Accordingly, the preferred systems can reduce the requirements and/or the pressure demands of pumps or other devices in the system 10. Consequently the pipes and device of the system can be specified to be smaller.

Because a dry ceiling-only fire protection system is preferably hydraulically configured with a hydraulic design area and designed operating pressure for a given storage occupancy, commodity classification and storage height, the preferred maximum and minimum fluid delivery periods are preferably functions of the hydraulic configuration, the occupancy ceiling height, and storage height. Thus, in addition or alternatively to, the maximum and minimum fluid delivery delay periods can be further configured as a function of the storage configuration, sprinkler-to-storage clearance and/or sprinkler-to-ceiling distance. For example, in the preferred the preferred system for the protection of storage commodities of up to Class III or its equivalent beneath a ceiling height of over forty-five feet with a hydraulic design area preferably ranging from six to eighteen (6-18) design sprinklers, the mandatory fluid delivery delay period is preferably of no more than thirty seconds. The mandatory fluid delivery delay period preferably includes from a minimum fluid delivery delay period ranging from zero to eight seconds (0-8 secs.) with a maximum fluid delivery delay period ranging from twenty to thirty seconds (20-30 sec.). More preferably, the mandatory fluid delivery delay period ranges from eight seconds to twenty-five seconds (8-25 secs) with the minimum fluid delivery delay period ranging from two-to-eight seconds (2-8 secs.) and the maximum fluid delivery delay period preferably ranging from twenty seconds to twenty-five seconds (20-25 secs). Alternatively or additionally, the mandatory fluid delivery delay of the system can range from any increment between the preferred minimum and maximum fluid delivery delay periods. For example, the mandatory fluid delivery delay period of the preferred system 10 can be in the range of any one of: two to five seconds (2-5 secs); five to ten second (5-10 secs.); ten to fifteen seconds (10-15 secs.); fifteen to twenty seconds (15-20 secs.); twenty to twenty-five seconds (20-25 secs.) or twenty-five to thirty seconds (25-30 secs.).

In one aspect of the systems and methods of fire protection using a preferred sprinkler, the maximum and minimum fluid delivery time design criteria can be embodied in a database, data table and/or look-up table. For example, provided below are fluid delivery design tables generated for up to Class III commodities at storage and ceiling heights for given design pressures and hydraulic design areas.

Mandatory Fluid Deliver Delay Period Table—Class III

| STORAGE HGT (FT.)/CEILING HGT (FT.) | DESIGN PRESSURE (PSI) | HYD. DESIGN AREA (NO. SPRINKLERS) | MAX FLUID DELIVERY PERIOD (SEC.) | MIN FLUID DELIVERY PERIOD (SECS.) |
|---|---|---|---|---|
| 45/50 | 50 | 15 | 20 | 0-8 |
| 50/55 | 50 | 16 | 20 | 0-8 |

The above tables preferably provide the maximum fluid delivery delay period for the one or more most hydraulically remote sprinklers 21 in a system. More preferably the data table is configured such that the maximum mandatory fluid delivery delay period is to be applied to the four most hydraulically remote sprinklers. When running a software model and simulation of system operation, for example as described herein, the four most hydraulically remote sprinklers can be sequenced and the absence of fluid discharge and more specifically, the absence of fluid discharge at design pressure can be verified at the stated time of sprinkler actuation. Thus, it can be iteratively verified that the fluid delivery is appropriately delayed at the time of sprinkler operation. For example, for a storage height of 45 ft. and ceiling height of 50 ft., a computer simulation can verify that fluid discharge at designed operating pressure is not present at any of the four most hydraulically remote sprinklers at the simultaneous time of sprinkler actuation or time zero. Alternatively, the computer simulation can verify that fluid discharge at designed operating pressure is not present following a sequence of sprinkler operations. Moreover, the simulation can verify that the minimum operating pressure is available at each of the four most hydraulically remote sprinklers within the maximum fluid delivery delay period. The minimum fluid delivery period preferably presents the minimum fluid delivery period to the four critical sprinklers hydraulically most close to the riser assembly. A computer simulation can verify that the minimum operating pressure is not available at any of the most hydraulically close four sprinklers within the minimum fluid delivery delay period following actuation.

Accordingly, a preferred data-table includes a first data array characterizing the storage occupancy, a second data array characterizing a sprinkler, a third data array identifying a hydraulic design area as a function of the first and second data arrays, and a fourth data array identifying a maximum fluid delivery delay period and a minimum fluid delivery delay period each being a function of the first, second and third data arrays. The data table can be configured as a look-up table in which any one of the first second, and third data arrays determine the fourth data array. Alternatively, the database can be simplified so as to present a single specified maximum fluid delivery delay period to be incorporated into a ceiling-only dry sprinkler system. The preferred simplified database can embodied in a data sheet for a sprinkler providing a single fluid delivery delay period that provides a surround and drown fire protection coverage for one or more commodity classifications and storage configuration stored in occupancy having a defined maximum ceiling height up to a defined maximum storage height.

Given the above system design criteria, and known metrics for characterizing piping systems and piping components, configurations, fire protection systems, a preferred fire protection configured for addressing a fire event can be modeled in system modeling/fluid simulation software. The sprinkler system and its sprinklers can be modeled and the sprinkler system can be sequenced to iteratively design a system capable of fluid delivery in accordance with the mandatory fluid delivery periods. For example, a dry ceiling-only sprinkler system configured for addressing a fire event with a surround and drown configuration can be modeled in a software package or program such as for example, in SprinkFDT-Q™ Fluid Delivery Calculation Program from Tyco Fire Protection Products, LP. Hydraulically remote and most hydraulically close sprinkler activations can be preferably sequenced in a desired manner to verify that fluid delivery occurs accordingly.

Alternatively to designing, manufacturing and/or qualifying a preferred ceiling-only dry sprinkler system or any of its subsystems or components, the process of obtaining the preferred system or any of its qualified components can entail, for example, acquiring such a system, subsystem or component. Acquiring the qualified sprinkler can further include receiving a qualified sprinkler, a preferred dry sprinkler system or the designs and methods of such a system as described above from, for example, a supplier or manufacturer in the course of a business-to-business transaction, through a supply chain relationship such as between, for example, a manufacturer and supplier; between a manufacturer and retail supplier; or between a supplier and contractor/installer. Alternatively acquisition of the system and/or its components can be accomplished through a contractual arrangement, for example, a contractor/installer and storage occupancy owner/operator, property transaction such as, for example, sale agreement between seller and buyer, or lease agreement between leasor and leasee.

Figure 6:
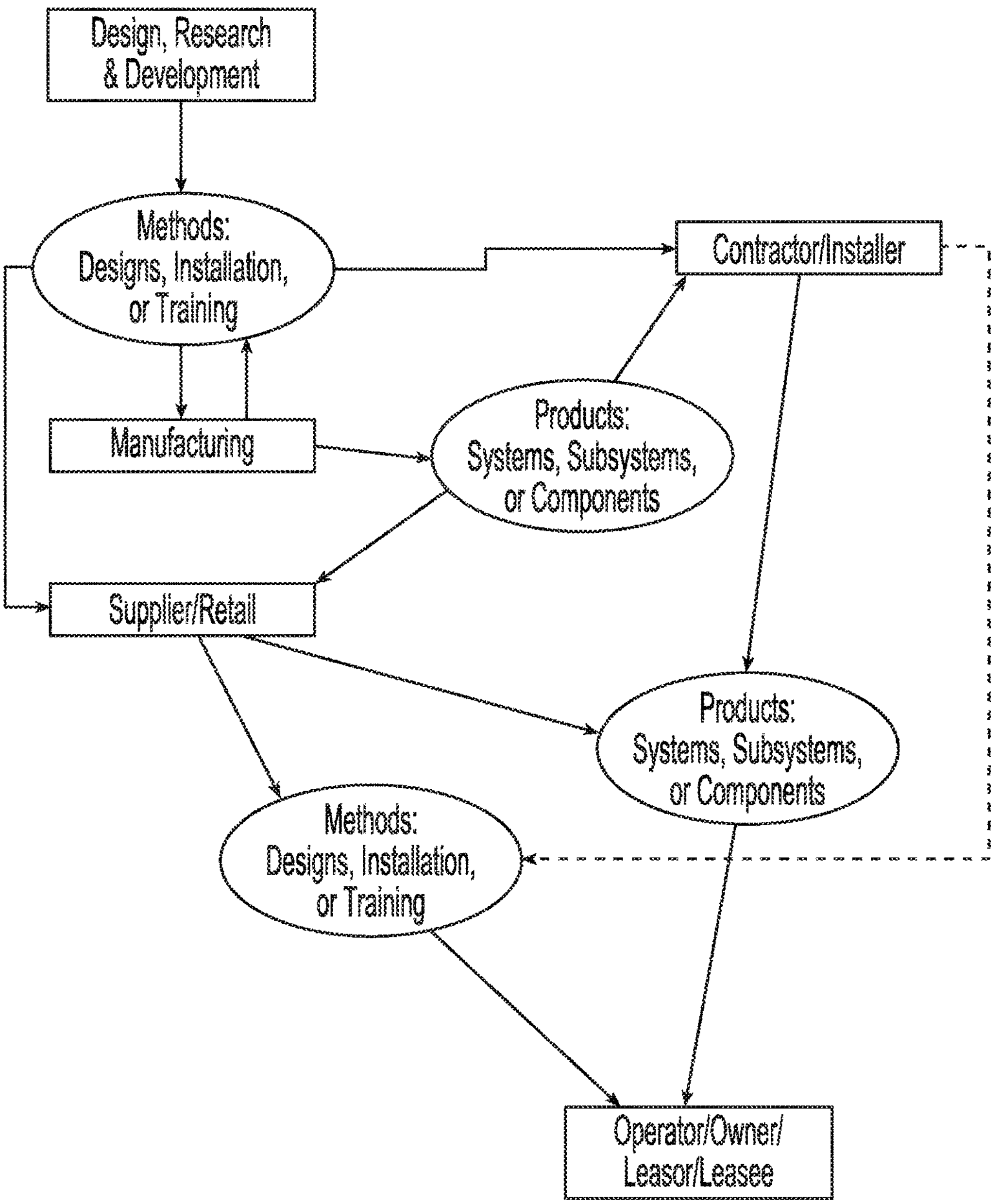
FIG. 6 is a schematic flow diagram of the lines of distribution of the preferred systems and methods.

In addition, the preferred process of providing a method of fire protection can include distribution of the preferred ceiling-only dry sprinkler system with a surround and drown thermal response, its subsystems, components and/or its methods of design, configuration and use in connection with the transaction of acquisition as described above. The distribution of the system, subsystem, and/or components, and/or its associated methods can includes the process of packaging, inventorying or warehousing and/or shipping of the system, subsystem, components and/or its associated methods of design, configuration and/or use. The shipping can include individual or bulk transport of the sprinkler 20 over air, land or water. The avenues of distribution of preferred products and services can include those schematically shown, for example, in FIG. 6, which illustrates how the preferred systems, subsystems, components and associated preferred methods of fire protection can be transferred from one party to another party. For example, the preferred sprinkler design for a sprinkler qualified to be used in a ceiling-only dry sprinkler for storage occupancy configured for addressing a fire event with a surround and drown configuration can be distributed from a designer to a manufacturer. Methods of installation and system designs for a preferred sprinkler system employing the surround and drown effect can be transferred from a manufacture to a contractor/installer. In one preferred aspect of the process of distribution, the process can further include publication of the preferred sprinkler system having a surround and drown response configuration, the subsystems, components and/or associated sprinklers, methods and applications of fire protection. For example, the sprinkler can be published in a catalog for a sales offering by any one of a manufacturer and/or equipment supplier. The catalog can be a hard copy media, such as a paper catalog or brochure or alternatively, the catalog can be in electronic format. For example, the catalog can be an on-line catalog available to a prospective buyer or user over a network such as, for example, a LAN, WAN or Internet. The preferred process of distribution can further include distributing a method for designing a preferred fire protection system.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. A fire protection system, comprising:

a plurality of sprinklers installed beneath a ceiling of a storage occupancy, the plurality of sprinklers having a sprinkler-to-sprinkler spacing greater than or equal to six-by-six feet and less than or equal to twenty-by-twenty feet, the plurality of sprinklers arranged in a hydraulic design area of greater than or equal to six and less than or equal to ten sprinklers, each sprinkler of the plurality of sprinklers having a coverage area greater than or equal to 80 square feet and less than or equal to 100 square feet, the storage occupancy having a commodity below the plurality of sprinklers and having a storage height greater than or equal to 45 feet and less than or equal to 60 feet, the ceiling having a ceiling height less than or equal to 65 feet;

each sprinkler of the plurality of sprinklers having a K-factor greater than or equal to 11 gpm/(psi)$^{1/2}$ and less than or equal to 36 gpm/(psi)$^{1/2}$, each sprinkler of the plurality of sprinklers having a deflector shape outputting fluid in a spray pattern having a rectangular shape in a plane below the deflector and perpendicular to an axis through the sprinkler, the rectangular shape comprising a central area and an outer area outward from the central area to a periphery of the rectangular shape, the central area having greater fluid distribution than the outer area.

2. The fire protection system of claim 1, comprising:

each sprinkler of the plurality of sprinklers comprises an outlet, a seal in the outlet, and a thermal trigger coupled with the seal, the thermal trigger at a distance from the ceiling greater than or equal to two inches and less than or equal to twelve inches.

3. The fire protection system of claim 1, comprising:

the plurality of sprinklers are arranged in a tree configuration, a gridded configuration, or a looped system configuration.

4. The fire protection system of claim 1, comprising: the plurality of sprinklers are coupled with a network of pipes to receive the fluid from the network of pipes, the network pipes having a main pipe and one or more branch pipes.

5. The fire protection system of claim 1, comprising: the plurality of sprinklers form a ceiling-only protection system.

6. The fire protection system of claim 1, comprising: the commodity is in an arrangement comprising at least one of multi-row rack storage arrangement, a double-row rack storage arrangement, a solid piled arrangement, an on floor arrangement, a rack without solid shelves arrangement, a palletized arrangement, a bin box arrangement, a shelf arrangement, and a single-row rack storage arrangement.

7. The fire protection system of claim 1, comprising: the commodity comprises at least one of a Class I, a Class II, a Class III, and a Class IV commodity in accordance with NFPA-13.

8. The fire protection system of claim 1, comprising: the commodity comprises a plastic commodity.

9. The fire protection system of claim 1, comprising: the rectangular shape comprises two or more linear edges centrally or equidistantly disposed about the corresponding sprinkler of the plurality of sprinklers.

10. The fire protection system of claim 1, comprising: the rectangular shape is within a 10 foot-by-10 foot perimeter centered about the axis through the corresponding sprinkler of the plurality of sprinklers in a plane between three feet and five feet below the deflector of the corresponding sprinkler.

11. The fire protection system of claim 1, comprising: each sprinkler of the plurality of sprinklers comprises an outlet, a seal in the outlet, and a thermal trigger coupled with the seal, the thermal trigger having a response time index less than or equal to 50 (meter seconds)$^{1/2}$.

12. The fire protection system of claim 1, comprising: each sprinkler of the plurality of sprinklers comprises an outlet, a seal in the outlet, and a thermal trigger coupled with the seal, the thermal trigger having a response time index greater than or equal to 130 (meter seconds)$^{1/2}$ and less than or equal to 150 (meter seconds)$^{1/2}$.

13. The fire protection system of claim 1, comprising: the plurality of sprinklers are pendent sprinklers.

14. A fire protection system, comprising:

a plurality of sprinklers installed beneath a ceiling of a storage occupancy, the plurality of sprinklers having a sprinkler-to-sprinkler spacing greater than or equal to six-by-six feet and less than or equal to twenty-by-twenty feet, the storage occupancy having a commodity below the plurality of sprinklers and having a storage height greater than or equal to 45 feet and less than or equal to 60 feet, the ceiling having a ceiling height less than or equal to 65 feet, each sprinkler of the plurality of sprinklers having a coverage area greater than or equal to 80 square feet and less than or equal to 100 square feet, each sprinkler of the plurality of sprinklers having a deflector shape outputting fluid in a respective spray pattern, each respective spray pattern having a rectangular shape in a plane below the deflector and perpendicular to an axis through the sprinkler, the rectangular shape comprising a central area and an outer area outward from the central area to a periphery of the rectangular shape, the central area having greater fluid distribution than the outer area; and a network of pipes coupled with the plurality of sprinklers to provide the fluid to the plurality of sprinklers, the plurality of sprinklers coupled with the network of pipes to be arranged in a hydraulic design area of greater than or equal to six and less than or equal to ten sprinklers.

15. The fire protection system of claim 14, comprising: each sprinkler of the plurality of sprinklers comprises an outlet, a seal in the outlet, and a thermal trigger coupled with the seal, the thermal trigger at a distance from the ceiling greater than or equal to two inches and less than or equal to twelve inches.

16. The fire protection system of claim 14, comprising: the plurality of sprinklers are arranged in a tree configuration, a gridded configuration, or a looped system configuration.

17. The fire protection system of claim 14, comprising: the plurality of sprinklers form a ceiling-only protection system.

18. The fire protection system of claim 14, comprising: the commodity is in an arrangement comprising at least one of multi-row rack storage arrangement, a double-row rack storage arrangement, a solid piled arrangement, an on floor arrangement, a rack without solid shelves arrangement, a palletized arrangement, a bin box arrangement, a shelf arrangement, and a single-row rack storage arrangement.

* * * * *